US009812971B1

United States Patent
(12) United States Patent
Tschirhart et al.

(10) Patent No.: US 9,812,971 B1
(45) Date of Patent: Nov. 7, 2017

(54) TRANSFORMER FLUX ESTIMATION AND LIMITING IN ISOLATED DC-DC VOLTAGE CONVERTERS

(71) Applicant: Infineon Technologies Austria AG, Villach (AT)

(72) Inventors: Darryl Tschirhart, Torrance, CA (US); Amir Babazadeh, Laguna Hills, CA (US)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 15/235,872

(22) Filed: Aug. 12, 2016

(51) Int. Cl.
*H02M 3/335* (2006.01)
*H02M 1/32* (2007.01)
*G01R 33/12* (2006.01)
*H02M 3/156* (2006.01)

(52) U.S. Cl.
CPC ........ *H02M 3/33507* (2013.01); *G01R 33/12* (2013.01); *H02M 1/32* (2013.01); *H02M 3/156* (2013.01)

(58) Field of Classification Search
CPC .... H02M 3/156; H02M 3/33507; H02M 1/32; G01R 33/12
See application file for complete search history.

(56) References Cited

U.S. PATENT DOCUMENTS 5,406,468 A 4/1995 Booth
2014/0266123 A1* 9/2014 Rader ................... H02M 3/156 323/288

OTHER PUBLICATIONS

Cheung, Victor Sui-Pung et al., "Capacitor Current Programming Technique for Phase-Shift DC-DC Converter", 2011 IEEE Energy Conversion Congress and Exposition (ECCE), Sep. 17-22, 2011, pp. 1251-1258.

Mappus, Steve, "Current Doubler Rectifier Offers Ripple Current Cancellation", TI Application Note, System Power, SLUA 323, Sep. 2004.

Oggier, Germán G. et al., "Boundary Control of Full-Bridge ZVS: Natural Switching Surface for Transient and Steady-State Operation", IEEE Transactions on Industrial Electronics, vol. 61, No. 2, Feb. 2014, pp. 969-979.

(Continued)

*Primary Examiner* — Emily P Pham
(74) *Attorney, Agent, or Firm* — Murphy, Bilak & Homiller, PLLC

(57) ABSTRACT

A switching voltage converter using an isolated topology includes a transformer for coupling power from an input source to an output load. The transformer must be protected to prevent saturation of its core due to excessive magnetic flux density as the transformer transfers power from its primary side to its secondary side. The magnetic flux is estimated using a voltage measured on the primary or secondary side of the transformer, wherein the secondary-side voltage may be a rectified voltage. If the estimated magnetic flux is detected as approaching a saturation level of the transformer core, any power being input to the transformer is curtailed. This may be accomplished by modifying pulse-width modulated (PWM) waveforms controlling power switches that control the input power transferred to the transformer. Using these techniques, transformer saturation may be avoided without requiring a significantly oversized transformer within the voltage converter.

34 Claims, 13 Drawing Sheets

(56) References Cited

OTHER PUBLICATIONS

Shi, Hongliang et al., "Dynamic Physical Limits of a Phase-Shifted Full Bridge Circuit for Power Supply of Magnetic Resonance Imaging Gradient Amplifiers", 41st Annual Conference of the IEEE, Industrial Electronics Society, IECON 2015, Nov. 9-12, 2015, pp. 4900-4904.

Tschirhart, Darryl et al., "Flux Limited Fast Transient Response in Isolated DC-DC Converters", U.S. Appl. No. 15/333,368, filed Oct. 25, 2016.

* cited by examiner

TRANSFORMER FLUX ESTIMATION AND LIMITING IN ISOLATED DC-DC VOLTAGE CONVERTERS

TECHNICAL FIELD

The present application relates to isolated voltage converters and, in particular, relates to techniques for estimating and tracking the magnetic flux within a transformer of such a voltage converter, in order to prevent the transformer core from saturating.

BACKGROUND

Isolated direct-current (DC) to DC switching voltage converters use a transformer to convert power from an input source into power for an output load. Such voltage converters include primary-side power switches that convert DC input power into alternating current (AC) power that is fed to the primary side of a transformer. AC power supplied on the secondary side of the transformer is rectified to convert it back into DC power which, in turn, is provided to the output load. The primary-side power switches are typically controlled by pulse-width modulated (PWM) waveforms. A PWM controller generates the PWM waveforms with a frequency and duty cycle that are appropriate to meet the power needs of the output load.

The transformer in an isolated DC-DC voltage converter must be protected in order to prevent saturation of the transformer core and associated failure of the primary-side power switches. As the magnetic flux density within the transformer core approaches a saturation level, the external magnetic field can no longer efficiently increase the magnetization of the transformer core. The effect of this is that the primary winding of the transformer begins to appear as an electrical short circuit, which leads to excessive current through the primary winding. Such excessive current also flows through the primary-side power switches and can damage them. In order to avoid destroying the primary-side power switches and other problems that are associated with transformer core saturation, e.g., excessive heat, transformer core saturation must be prevented in DC-DC voltage converters.

The most direct technique for preventing core saturation is to measure the current flowing through the primary-side winding, and compare it against some current limit that indicates the core is saturating. If the primary-side current exceeds this limit, the PWM waveforms may be adjusted (e.g., a duty cycle of a PWM waveform may be reduced) to prevent the core from saturating. This technique requires sensing the primary-side current, which requires additional circuitry and which typically has some associated power loss. While such a technique is effective and may also be used to balance the half cycles of current and flux, it may not be feasible in some applications. In particular, this technique is not appropriate in isolated DC-DC voltage converters wherein the PWM generator and/or controller is located on the secondary side of the transformer.

Without active prevention of core saturation, as described above, a transformer core is susceptible to flux walkaway, in which small mismatches in the positive and negative half cycles of the voltage converter lead to a gradual increase in the flux magnitude which, eventually, leads to saturation of the transformer core. This can be addressed by balancing the positive and negative half cycles. One technique for doing so is to couple power into the primary-side winding using capacitors. This is often not a preferred technique, due to the added circuitry (size), component cost, power loss, etc., as well as that such a technique does guarantee safe operation. Other flux-balancing techniques, which may operate in conjunction with or as alternatives to capacitor usage, serve to balance positive and negative half cycles over a fairly large time scale, but do not immediately recognize and prevent core saturation. Because such flux-balancing techniques are fairly slow acting, the average transformer flux will tend to rise to positive values or fall to negative values, before the flux-balancing techniques are able to compensate for such excursions. In order to ensure a transformer core does not saturate when using such slow-acting flux balancing, the transformer must be designed with a significantly higher flux saturation level than would be required if perfect flux balancing were available. This may be done by choosing a transformer having an air gap or that is physically larger (e.g., having a larger core cross-sectional area) than otherwise necessary, in order to achieve an adequate safety margin for the flux saturation. Such an overdesigned transformer should be avoided in most applications, due to, e.g., its increased size and increased cost.

Accordingly, there is a need for improved techniques for estimating magnetic flux within the transformer of a DC-DC voltage converter, for immediately preventing saturation of the transformer core, and for balancing the positive and negative flux excursions within the transformer. Such techniques should be feasible for implementation on the primary or the secondary side of the voltage converter, and should not require sensing the primary-side current. Use of such techniques should allow isolated DC-DC voltage converters to be designed with smaller and more efficient transformers, while achieving safe operation that avoids transformer core saturation.

SUMMARY

According to an embodiment of a switching voltage converter, the voltage converter includes a power stage, a transformer, a conditioning circuit, and a controller. The power stage is coupled to an input power source and includes one or more power switches. The transformer includes primary and secondary windings, with the primary winding coupled to the power stage. The conditioning circuit couples the secondary windings of the transformer to an output node that is operable to supply power to a load of the voltage converter. The controller is operable to generate pulse-width modulated (PWM) waveforms for controlling the power switches of the power stage, wherein each PWM waveform is comprised of a series of PWM pulses. The controller is also operable to estimate the magnetic flux within the transformer based upon a voltage within the voltage converter. This voltage may be taken across the primary winding of the transformer, across the secondary winding of the transformer, or elsewhere within the conditioning circuit. The estimated magnetic flux is used to detect an overflux condition in which the estimated magnetic flux has exceeded a flux magnitude limit for the transformer. If such a condition is detected, a pulse within the PWM waveforms is truncated before the PWM waveforms are provided to the one or more power switches.

According to a method within a voltage converter, magnetic flux saturation within the core of a transformer is avoided by estimating the transformer's magnetic flux and curtailing power input to the transformer if the estimated magnetic flux approaches a saturation limit. The method includes the step of generating pulse-width modulated (PWM) waveforms for controlling one or more power switches within the voltage converter, wherein each PWM waveform is comprised of a series of PWM pulses. The magnetic flux of the transformer is estimated based upon a voltage across the primary winding of the transformer, a voltage across the secondary winding of the transformer, or a voltage elsewhere on the secondary side of the voltage converter. If the estimated magnetic flux exceeds a flux magnitude limit for the transformer, an overflux condition is detected. In response to detecting such an overflux condition, one or more pulses within the generated PWM waveforms are truncated in order to temporarily disable power from being input to the transformer core. The modified PWM waveforms are provided to the power switches.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

DETAILED DESCRIPTION

Figure 1:
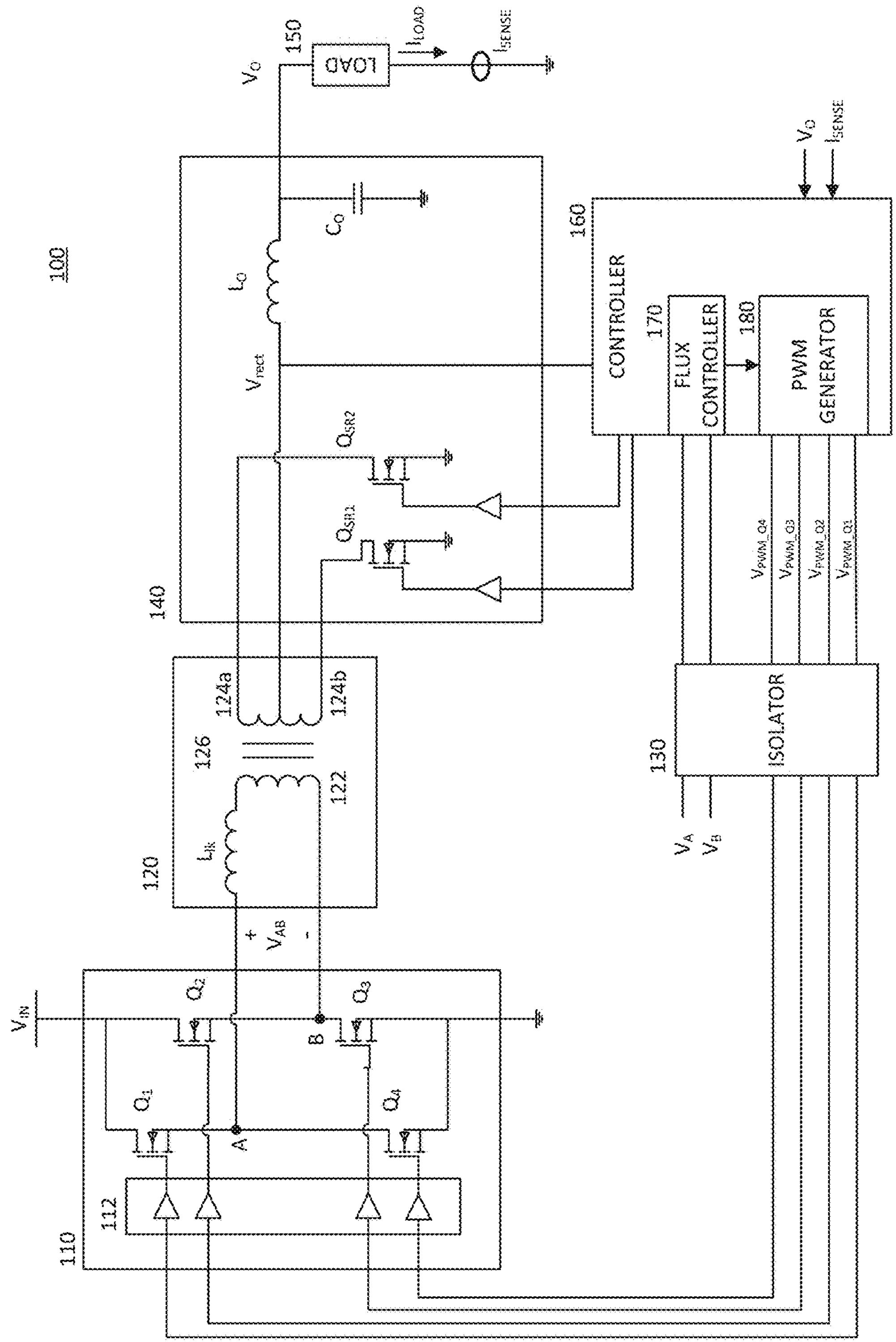
FIG. 1 illustrates a circuit diagram of a voltage converter using a full-bridge topology, wherein the voltage converter is configured to estimate magnetic flux within a transformer and to modify PWM waveforms to prevent saturation of the transformer core.

The embodiments described herein provide techniques for estimating magnetic flux within a transformer core of an isolated DC-DC voltage converter. The estimated magnetic flux is continually tracked and, if it approaches a flux saturation limit of the transformer, a controller of the voltage converter immediately curtails the power being input to the transformer. This may be accomplished, e.g., by modifying pulse-width modulated (PWM) waveforms that control power switches that provide current to a primary winding of the transformer. The PWM waveforms may be modified with very little delay meaning that it is not necessary to have a large safety margin in order to prevent transformer core flux saturation. This, in turn, means that a smaller transformer may be used as compared with DC-DC voltage converters that do not use such flux estimation and tracking techniques.

The flux estimation described herein may also be used for flux balancing, e.g., in a slow control loop. While the flux estimation, flux tracking, and flux limiting techniques described herein make flux balancing less important, at least for preventing core saturation, it is still desirable to maintain an average flux density near zero. The average magnetic flux could drift to non-zero values due to implementation issues such as timing mismatches between the positive and negative half cycles, a change in the load requirements, or a DC offset for the average voltage applied to a primary-side winding of the transformer. By maintaining a running average of the flux estimation, a long-term non-zero average flux may be identified, and the controller can adapt the PWM waveforms to drive this long-term average flux to zero.

The flux estimation techniques described below do not rely upon sensing a current on the primary-side of an isolated DC-DC voltage converter. Instead, the flux is estimated using voltages sensed at various nodes within the DC-DC voltage converter. More particularly, the techniques described below estimate flux using a voltage corresponding to the transformer's primary winding, a voltage corresponding to the transformer's secondary winding, or a rectified voltage on the secondary-side of the DC-DC voltage converter.

The flux estimation and tracking is performed within a controller of the DC-DC voltage converter. This controller also includes a PWM generator, which provides the signals used to control the power switches on a primary side of the DC-DC voltage converter. If the controller detects that the flux estimation is nearing a flux saturation limit, the controller will modify the PWM signals to curtail further power from being input to the transformer and, thereby, prevent the transformer core from reaching a saturation point. The techniques presented herein are particularly appropriate for a controller located on the secondary side of a DC-DC voltage converter, but could be readily extrapolated to a controller implemented on the primary side of such a converter.

The techniques described herein are not limited to single-phase or multi-phase voltage converters. For clarity in the following description, the techniques are described in the context of a single-phase voltage converter, but it should be appreciated that the techniques are readily extrapolated to multi-phase voltage converters. Furthermore, the techniques apply to both fixed and variable-frequency DC-DC voltage converters. For clarity in the following description, voltage converters using a fixed switching frequency are shown, but it should be appreciated that the techniques could be applied to variable-frequency voltage converters.

Various embodiments of voltage converter circuits and methods within voltage converters are provided in the following detailed description and the associated figures. The described embodiments provide particular examples for purposes of explanation, and are not meant to be limiting. Features and aspects from the example embodiments may be combined or re-arranged, except where the context does not allow this.

Three exemplary embodiments of voltage converter circuits are described in the following. These embodiments vary primarily in the techniques used for estimating the magnetic flux of a transformer within a DC-DC voltage converter. In a first of these embodiments, the voltage across a primary winding of the transformer is used for estimating the magnetic flux. In a second embodiment, the voltage across a secondary winding of the transformer is used for estimating the magnetic flux. In a third embodiment, a rectified voltage on the secondary side of the transformer is used for estimating the magnetic flux. These embodiments are described for voltage converters using a full-bridge topology, but the techniques are also applicable to other topologies. A variation of the third embodiment is described to show how the techniques may be used within an active clamp forward topology. In addition to the voltage converter embodiments, an embodiment of a method within a voltage converter is also described.

FIG. 1 illustrates a DC-DC voltage converter 100 within which magnetic flux estimating, limiting, and balancing techniques may be implemented. The illustrated voltage converter 100 is a full-bridge converter, but the techniques also apply to other push-pull topologies, active clamp forward topologies, etc. The voltage converter 100 includes a power stage 110, a transformer 120, an isolator 130, a conditioning circuit 140 and a controller 160. An input power source $V_{IN}$ provides power to the voltage converter 100, and the voltage converter 100 supplies output power to a load 150.

The input power source $V_{IN}$ is provided to the power stage 110, which couples it to the transformer 120 using power switches. The power stage 110 includes four power switches $Q_1$, $Q_2$, $Q_3$, $Q_4$, each of which has an associated driver within a driver stage 112. The switches $Q_1$, $Q_2$, $Q_3$, $Q_4$ are oriented in a full-bridge configuration. During an active interval within a positive half-cycle of the voltage converter 100, switches $Q_1$ and $Q_3$ are conducting, thereby producing a positive voltage across $V_{AB}$ that is provided to the transformer 120. During an active interval within a negative half-cycle of the voltage converter 100, switches $Q_2$ and $Q_4$ are conducting, thereby providing a negative voltage to the transformer 120 across its input $V_{AB}$. Additionally, there may be "dead time" intervals during which none of the switches $Q_1$, $Q_2$, $Q_3$, $Q_4$ are conducting and no voltage is provided to the transformer 120 across $V_{AB}$.

The power switches $Q_1$, $Q_2$, $Q_3$, $Q_4$ are illustrated in FIG. 1 as enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The power switches $Q_1$, $Q_2$, $Q_3$, $Q_4$ may be integrated on the same semiconductor die, may each be provided on separate dies, or may otherwise be spread across a plurality of semiconductor dies. The drivers within the driver stage 112 may be integrated on the same semiconductor die(s) as their corresponding switches $Q_1$, $Q_2$, $Q_3$, $Q_4$, or may be provided on separate dies.

The transformer 120 includes a primary winding 122 having N1 turns, secondary windings 124*a*, 124*b* having N2 turns each, and a core 126. The transformer 120 of FIG. 1 also includes a leakage inductance $L_{LK}$, which is not a separate component but which models stray inductance that is not included in the windings 122, 124*a*, 124*b*. The secondary windings 124*a*, 124*b* are connected together at a center tap. A rectified voltage node $V_{rect}$ is coupled to this center tap. Presuming the effect of the leakage inductance $L_{LK}$ to be insignificant, the ratio N2/N1 determines the ratio of the rectified voltage $V_{rect}$ to the input voltage $V_{AB}$ of the transformer 120.

The conditioning circuit 140 is configured to rectify the voltage output from the secondary windings 124*a*, 124*b* and to filter the rectified voltage $V_{rect}$ before it is provided to the load 150. As shown in FIG. 1, rectification switches $Q_{SR1}$, $Q_{SR2}$ are controlled by the controller 160 to produce the rectified voltage $V_{rect}$ from the AC voltage induced across the secondary windings 124*a*, 124*b*. (The rectified voltage $V_{rect}$ may need to be shifted, e.g., using a resistor divider, before being input to the controller 160. For ease of illustration, this is not shown.) Other rectification circuits or techniques may be used. For example, diodes may couple each outer terminal of the secondary windings 124*a*, 124*b* to a rectified voltage node, while the center tap is coupled to a ground of the load 150. In another alternate configuration, four diodes in a bridge configuration may be used with a secondary winding that has no center tap. In general, such diode-based rectification is not preferred for low voltages due to the power loss associated with the diodes, as compared with the active rectification using power switches $Q_{SR1}$, $Q_{SR2}$ as shown in FIG. 1. The conditioning circuit 140 also includes an output inductor $L_O$ and capacitor $C_O$ which form an LC filter. The LC filter serves to smooth the voltage $V_O$ provided to the load 150.

The controller 160 is responsible for controlling the voltage converter 100 in order to supply the necessary power (voltage $V_O$ and current $I_{LOAD}$) to the load 150. This includes controlling the rectification switches $Q_{SR1}$, $Q_{SR2}$ to generate the rectified voltage $V_{rect}$, and generating PWM waveforms $V_{PWM\_Q1}$, $V_{PWM\_Q2}$, $V_{PWM\_Q3}$, $V_{PWM\_Q4}$ that control the switches $Q_1$, $Q_2$, $Q_3$, $Q_4$ of the power stage 110. Techniques for controlling rectification switches are well-known in the art, and such conventional techniques are not described here in order to avoid obscuring the unique aspects of this invention. The PWM waveforms $V_{PWM\_Q1}$, $V_{PWM\_Q2}$, $V_{PWM\_Q3}$, $V_{PWM\_Q4}$ that control the power switches $Q_1$, $Q_2$, $Q_3$, $Q_4$ are generated to ensure the load 150 is supplied adequate power, and this generation is typically based upon the output voltage $V_O$ and/or the load current $I_{LOAD}$. Conventional techniques are used to generate baseline PWM waveforms, based upon load requirements. For example, a proportional, integral and derivative (PID) controller might use the output voltage $V_O$ to adaptively determine duty cycles for the PWM waveforms $V_{PWM\_Q1}$, $V_{PWM\_Q2}$, $V_{PWM\_Q3}$, $V_{PWM\_Q4}$. Because such techniques are well-known, they will not be described further herein. (The output voltage $V_O$ may need to be shifted, e.g., using a resistor divider, before being input to the controller 160. For ease of illustration, this is not shown.) Instead, the following description focuses on the unique aspects of this invention, which are directed to techniques for modifying the PWM waveforms $V_{PWM\_Q1}$, $V_{PWM\_Q2}$, $V_{PWM\_Q3}$, $V_{PWM\_Q4}$ in order to prevent saturation of the transformer core 126, wherein the PWM waveform modification is based upon an estimation of flux within the transformer core 126.

The controller 160 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 160 may also include memory, e.g., non-volatile memory such as flash, that includes instructions or data for use by the processor circuitry, and one or more timers. The controller 160 inputs sensor signals such as signals corresponding to $V_O$, $V_{rect}$ and $I_{SENSE}$.

The voltage converter controller 160 includes a flux controller 170 and a PWM generator 180. The flux controller 170 is configured to estimate and track the magnetic flux of the transformer 120, to limit this magnetic flux by altering the PWM waveforms $V_{PWM\_Q1}$, $V_{PWM\_Q2}$, $V_{PWM\_Q3}$, $V_{PWM\_Q4}$ generated by the PWM generator 180, and, optionally, to balance the magnetic flux by driving its long-term average to zero. These techniques are initially described using the waveforms of FIGS. 2, 3, and 4. More detailed descriptions of an exemplary flux controller and an exemplary PWM generator are provided in FIGS. 9 and 10.

The change in the magnetic flux density (B) within a transformer core over a time interval $T_x$ is given by:

$$\Delta B = \frac{\int_{t_0}^{t_0+T_x} v(t)dt}{NA}, \tag{1}$$

where v(t) is the voltage across a winding of the transformer,

N is the number of turns of the transformer winding, and

A is the cross-sectional area of the transformer.

Assuming $t_0$ is the beginning of a switching cycle of the voltage converter 100, and $T_x$ is the switching period (i.e., the inverse of the switching frequency), the flux density change over the period $T_x$ is ideally zero. This occurs when the positive flux excursion occurring during a positive half-cycle of the voltage converter is perfectly balanced with the negative flux excursion occurring during a negative half-cycle of the voltage converter. Such perfect balance between the positive and negative excursions may be disrupted for various reasons including, e.g., a load release that decreases the PWM duty cycle, a load step that increases the PWM duty cycle, and a change in the source voltage $V_{IN}$ that is coupled to the transformer 120.

Considering the primary side of the transformer 120 and assuming the leakage inductance $L_{LK}$ is insignificant, the flux change of equation (1) may be rewritten as:

$$\Delta BN_1A=\int_{t_0}^{t_0+T_x} v_{AB}(t)dt, \tag{2}$$

where $N_1$ is the number of turns in the primary winding 122,

A is the cross-sectional area of the transformer 120, and $V_{AB}(t)$ is the voltage across the primary side of the transformer 120.

Converting equation (2) into discrete time wherein the voltage $V_{AB}$ is sampled using a sample clock having a period T leads to:

$$\Delta BN_1A=T^*\Sigma_{k_0}^{k_0+K} v_{AB}(k), \text{ over the period from } k_0 \text{ to } k_0+K. \tag{3}$$

The right-hand sides of equations (2) and (3) may be considered to provide variants of the magnetic flux change, wherein the variants are provided in Volt-seconds. Design parameters for the number of turns $N_1$ of the primary winding 122, the effective core area A of the transformer 120, and the flux density saturation limit $B_{SAT}$ are stored in the controller 160. For example, the controller 160 may contain a non-volatile memory (not shown) for storing these values, and the values may be loaded into the memory during a configuration or calibration stage of the voltage converter 100. Given these parameters, an upper saturation limit given by $B_{SAT}N_1A$ and a lower saturation limit given by $-B_{SAT}N_1A$, both of which are in Volt-seconds, may be used to indicate an overflux condition of the transformer core 126.

Figure 2:
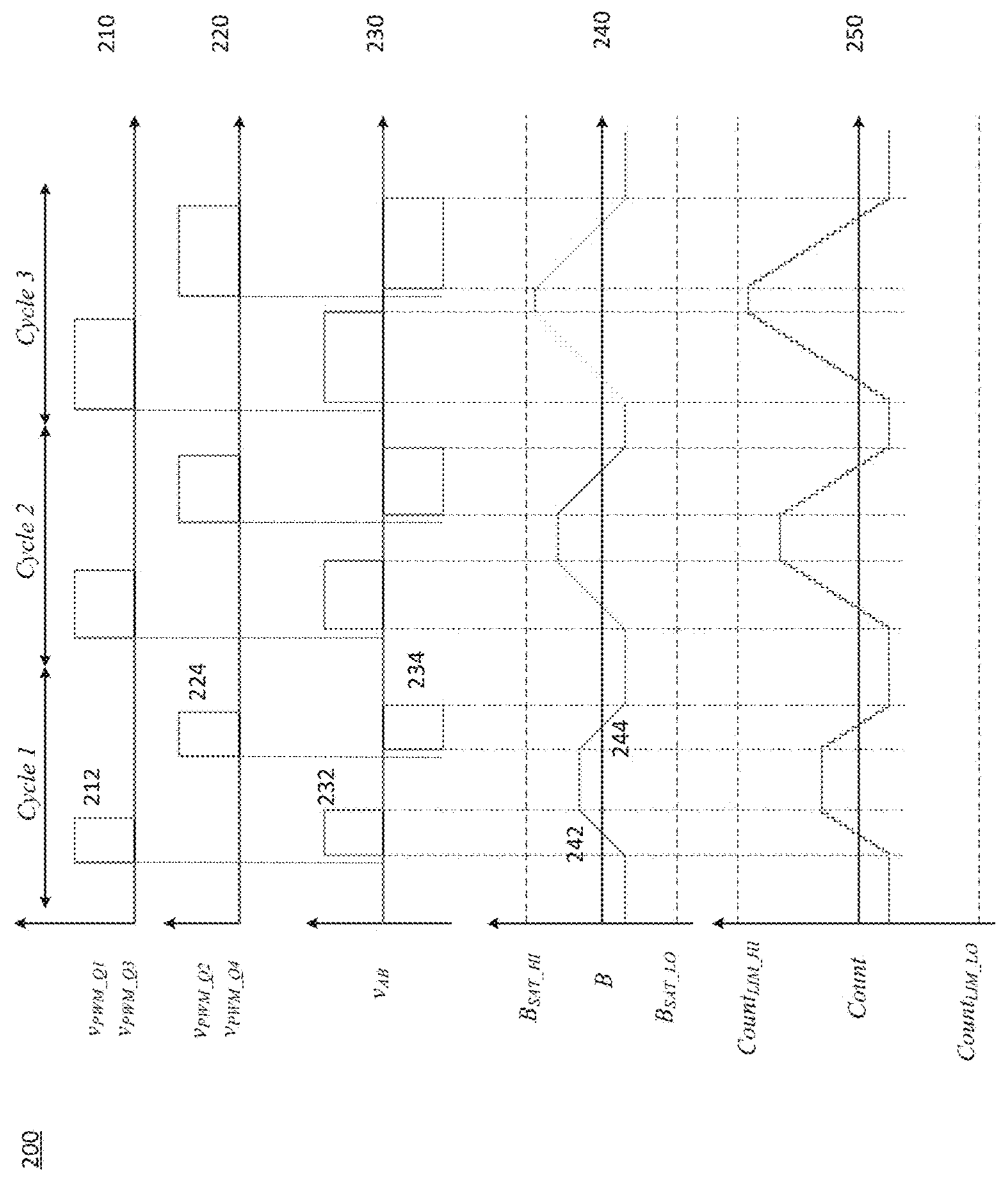
FIG. 2 illustrates waveforms corresponding to PWM control signals, actual magnetic flux, and estimated magnetic flux within a voltage converter such as that shown in FIG. 1.

FIG. 2 illustrates the magnetic flux B in the transformer core 126 over three cycles of the voltage converter 100, as well as an estimation of the magnetic flux as tracked in the controller 160. These waveforms 200 illustrate operation during which the magnetic flux B is confined within saturation limits $B_{SAT\_HI}$, $B_{SAT\_LO}$ ($B_{SAT\_HI}=B_{SAT}$, $B_{SAT\_LO}=-B_{SAT}$). In a sub-embodiment of a voltage converter corresponding to the illustrated waveforms 200, a counter within the flux controller 170 is used to estimate the magnetic flux B. Whenever the primary-side voltage $V_{AB}$ is detected as being high (positive), the counter is incremented, whereas the counter is decremented whenever the primary-side voltage $V_{AB}$ is detected as being low (negative). The counter is unchanged if the primary-side voltage $V_{AB}$ is at or near zero. The determination of whether the primary-side voltage $V_{AB}$ is high, low or near zero is performed by the flux controller 170, which, as shown in FIG. 1, inputs voltages corresponding to nodes A and B via the isolator 130. In this sub-embodiment, the implementation of equation (3) is effectively simplified to assume a constant value for $V_{IN}$, and that the magnitude of $V_{AB}$ is equivalent to this constant value, as indicated in the following variation of equation (3):

$$\Delta BN_1A = v_{IN}T * \sum_{k_0}^{k_0+K} \delta_{AB}(k), \tag{4}$$

$$\text{wherein } \delta_{AB}(k) = \begin{cases} 1, \text{ if } v_{AB}(k) > v_{AB\_THRESH} \\ -1, \text{ if } v_{AB}(k) < -v_{AB\_THRESH} \\ 0, \text{ otherwise} \end{cases}.$$

In equation (4), the threshold $V_{AB\_THRESH}$ is chosen to be at some value between 0 and an expected value of $V_{IN}$, $$\text{e.g., } V_{AB\_THRESH} \text{ could be } \frac{v_{IN}}{2}.$$

The PWM generator 180 provides PWM waveforms 210, 220 that control the power switches $Q_1$, $Q_2$, $Q_3$, $Q_4$. During a positive interval of each cycle, a PWM pulse is generated on the control signals $V_{PWM\_Q1}$, $V_{PWM\_Q3}$ in order to enable the power switches $Q_1$ and $Q_3$, as exemplified by the pulse 212 during cycle 1. During a negative interval of each cycle, a PWM pulse is generated on the control signals $V_{PWM\_Q2}$, $V_{PWM\_Q4}$ in order to enable the power switches $Q_2$ and $Q_4$, as exemplified by the pulse 224 during cycle 1. This leads to positive and negative voltage pulses across $V_{AB}$, such as the pulses 232, 234 during cycle 1. Due to circuit delays through the isolator 130, the driver stage 112, and the power switches $Q_1$, $Q_2$, $Q_3$, $Q_4$, the voltage pulses across $V_{AB}$ are slightly delayed relative to the PWM control signals $V_{PWM\_Q1}$, $V_{PWM\_Q3}$, $V_{PWM\_Q2}$, $V_{PWM\_Q4}$ output by the PWM generator 180.

The magnetic flux B changes over time as illustrated in the waveform 240. A first increase 242 in the flux is generated by the first positive voltage pulse 232 across $V_{AB}$. This is followed by a first flux decrease 244 that corresponds to the first negative voltage pulse 234 across $V_{AB}$. The duty cycles of the PWM waveforms 210, 220, increase during cycles 2 and 3 due, e.g., to an increased power requirement of the load 150. As illustrated, an (undesirable) positive bias develops for the magnetic flux B during cycles 2 and 3.

A counter located in the flux controller 170 increments whenever the voltage $V_{AB}$ is detected as being positive, and decrements whenever the voltage $V_{AB}$ is detected as being negative. The counter effectively tracks a variant of the value described in equation (4). A waveform 250 corresponding to the resultant count is illustrated in FIG. 2, and it can be seen that this Count estimates the actual magnetic flux B waveform 240. Count limits $Count_{LIM\_HI}$, $Count_{LIM\_LO}$ corresponding to the magnetic flux limits $B_{SAT\_HI}$, $B_{SAT\_LO}$ are also shown in the Count waveform 250. The count limits may be given by:

$$\text{Count}_{LIM\_HI} = \frac{N_1 * A * B_{SAT\_HI}}{T * v_{IN}} - \Delta, \quad (5)$$

$$\text{Count}_{LIM\_LO} = \frac{N_1 * A * B_{SAT\_LO}}{T * v_{IN}} + \Delta.$$

The flux limits $B_{SAT\_HI}$, $B_{SAT\_LO}$ may be set to, e.g., a saturation flux level+/−$B_{SAT}$ of the transformer core 126 and the increment Δ represents a safety margin to ensure the magnetic flux limits $B_{SAT\_HI}$, $B_{SAT\_LO}$ are not actually reached due to practical considerations such as, e.g., circuit delays.

The waveforms 200 illustrated in FIG. 2 show how a counter may be used to estimate the magnetic flux, but do not address any actions taken if the magnetic flux magnitude, or an estimate thereof, exceeds some threshold. Such a situation is illustrated in the waveforms 300 of FIG. 3. These waveforms 300 are similar to the waveforms 200 of FIG. 2, except that the counter, which estimates the magnetic flux B, reaches a count limit and, as a result, the PWM waveform 310 is modified to curtail the power input to the transformer 120.

At time $t=t_{EXC}$, the Count reaches or exceeds the upper count limit $Count_{LIM\_HI}$. This is detected by the flux controller 170 which, in response to said detection, indicates to the PWM generator 180 that it should promptly curtail any power being input to the transformer 120. In response to this indication, the PWM generator 180 clamps the ongoing positive pulse 313 within cycle 3. Stated alternatively, the pulse 313 is shortened (truncated) relative to what it would have been without detecting a high-flux condition. Note that there is a slight delay between the detection at time $t=t_{EXC}$ and the falling edge of the pulse 313. Shortly after the falling edge of PWM pulse 313, the power switches $Q_1$ and $Q_3$ are disabled, and the input source voltage $V_{IN}$ is disconnected from the transformer input voltage $V_{AB}$, as indicated by the falling edge of the positive $V_{AB}$ pulse 335 within cycle 3. At this point, the magnetic flux B stops rising, as does the magnetic flux estimation tracked by the Count waveform 350. Note that while the count limit $Count_{LIM\_HI}$ is briefly exceeded, the magnetic flux B stays below the flux limit $B_{SAT\_HI}$. The negative pulse 337 of the $V_{AB}$ waveform during cycle 3 is unaffected by any clamping. Over the 3 cycles illustrated in FIG. 3, the magnetic flux waveform 340 and the Count waveform 350 exhibit a positive bias (average), but the clamping serves to reduce this bias relative to an embodiment in which there is no clamping.

As described thus far, the flux controller 170 uses a counter with a fixed increment/decrement to estimate the magnetic flux B. While such an implementation may work well when the input voltage $V_{IN}$ is very stable, problems may occur if there is variation in the input voltage $V_{IN}$. Such a situation is illustrated in the waveforms 400 of FIG. 4. For ease of illustration, the PWM control signals $V_{PWM\_Q1}$, $V_{PWM\_Q3}$, $V_{PWM\_Q2}$, $V_{PWM\_Q4}$, are not shown, but it should be understood that these control signals are as explained above in FIG. 2 and FIG. 3.

Figure 3:
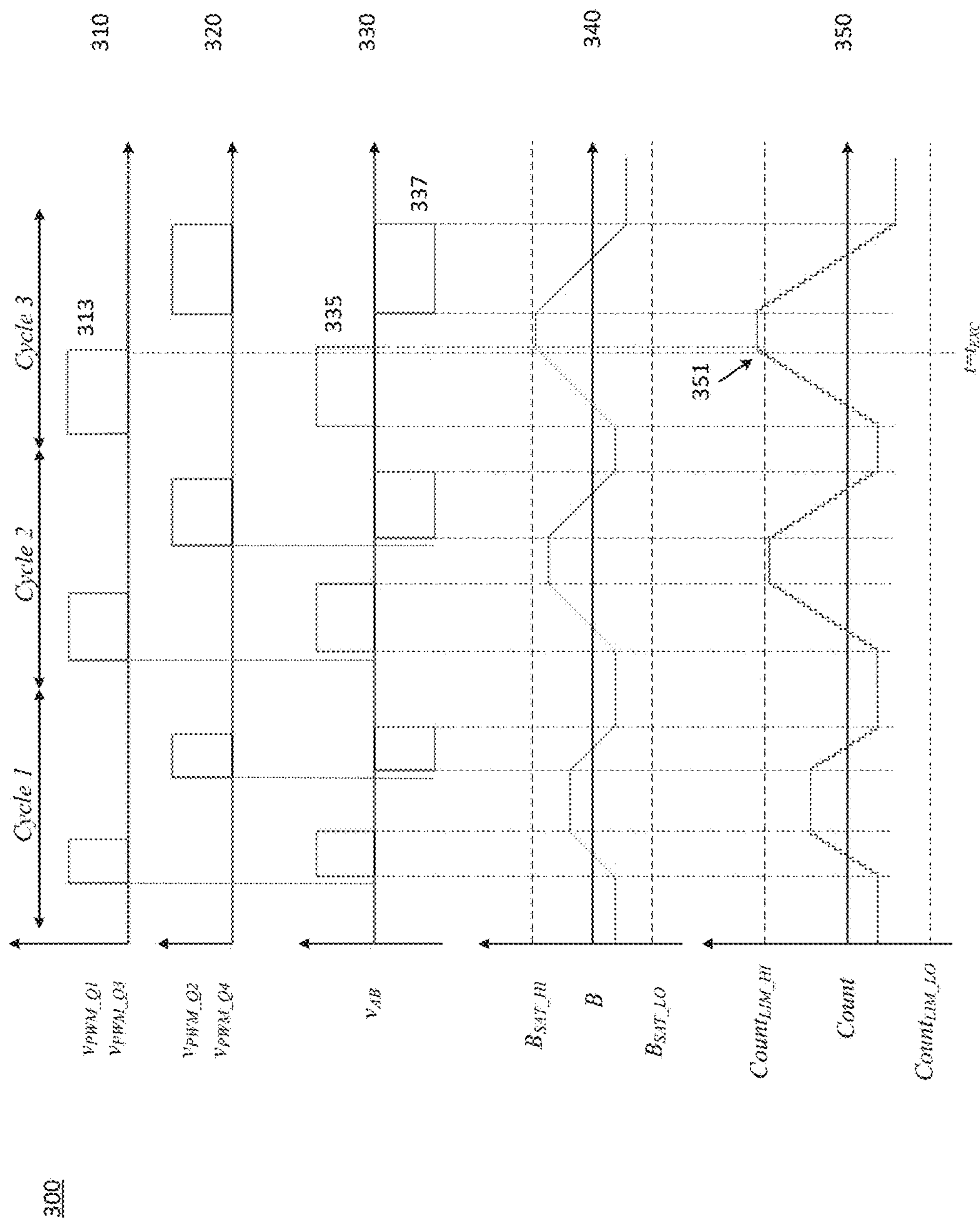
FIG. 3 illustrates waveforms similar to those of FIG. 2, but also illustrates detection of a high-flux condition and the resultant modification of the PWM waveforms.
Figure 4:
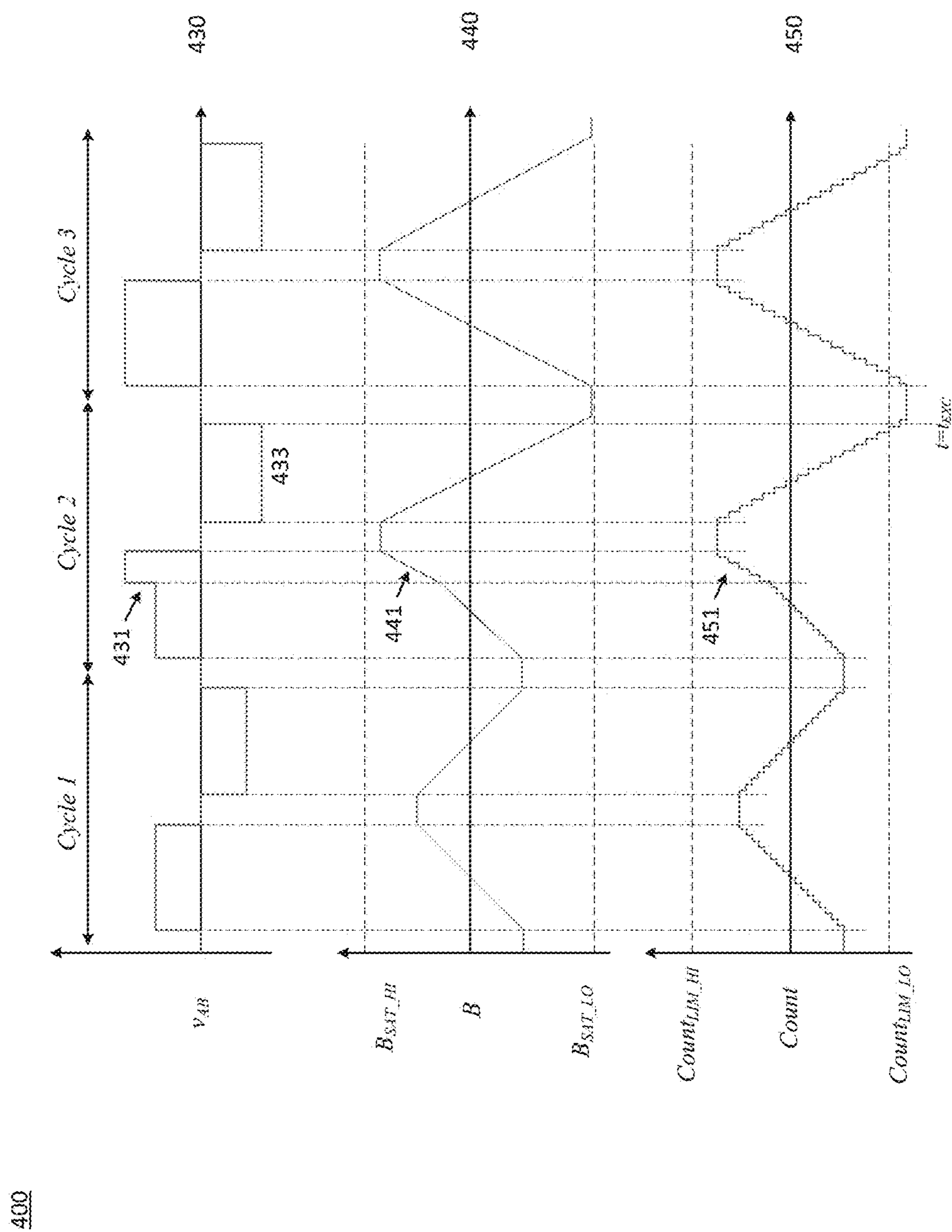
FIG. 4 illustrates waveforms corresponding to a transformer input voltage, the actual magnetic flux of the transformer, and an estimated magnetic flux of the transformer, for a situation in which the input to the transformer includes a step increase in its voltage.

Whereas FIGS. 2 and 3 illustrate a situation wherein an increase in the power required by the load 150 (i.e., a load step) causes increasing $V_{AB}$ pulse intervals, the $V_{AB}$ pulse intervals of FIG. 4 are relatively stable. However, a step change 431 in the magnitude of the $V_{AB}$ pulses occurs during cycle 2. Such a step change 431 may occur due to an increase in the source voltage $V_{IN}$. Responsive to the increased magnitude 431 of the $V_{AB}$ pulses, the rate of change (slope) of the magnetic flux B increases 441. If the counter used for estimating this flux uses a fixed increment/decrement, as in the sub-embodiment corresponding to the waveforms of FIG. 3, the resultant count will not account for the increased voltage $V_{IN}$, the corresponding increase in the $V_{AB}$ pulse magnitudes, and the resultant magnetic flux B increase. In turn, the flux estimation provided by the counter will not accurately track the actual magnetic flux B meaning that either the flux limits $B_{SAT\_HI}$, $B_{SAT\_LO}$ may be exceeded or that a large safety margin, e.g., a large value for the Δ parameter mentioned in the prior sub-embodiment, is required when determining the count limits $Count_{LIM\_HI}$, $Count_{LIM\_LO}$.

In a further sub-embodiment, the above problems are addressed by using a variable increment/decrement for the counter, which provides a more accurate flux estimate and which accounts for variation in the input source voltage $V_{IN}$. Such an embodiment more closely implements the flux estimation of equation (3), as opposed to the simplified implementation associated with equation (4). The improved flux estimate (Count) is given by:

$$\text{Count}=\Delta B N_1 A = T*\Sigma+_{k_0}^{k0+K} v_{AB}(k), \text{ over the period from } k_0 \text{ to } k_0+K. \quad (6)$$

The waveforms 400 resulting from a sub-embodiment making use of such an improved flux estimate are shown in FIG. 4. Note that the count limits $Count_{LIM\_LO}$, $Count_{LIM_{HI}}$ are modified such that they are no longer normalized by an expected input voltage $V_{IN}$. Hence, these limits may be given by:

$$\text{Count}_{LIM\_HI} = \frac{N_1 * A * B_{SAT\_HI}}{T} - \Delta, \tag{7}$$

$$\text{Count}_{LIM\_LO} = \frac{N_1 * A * B_{SAT\_LO}}{T} + \Delta.$$

According to the waveform 430 illustrated in FIG. 4, the voltage $V_{AB}$ provided to the transformer 120 has a step increase 431 in its value during a positive interval of cycle 2. This causes an increase in the rate 441 at which the magnetic flux B is increasing, as shown in the flux waveform 440. The flux estimation based upon a Count as given by equation (6) tracks 451 this increased magnetic flux rate 441. The Count waveform 450 does not reach the upper count limit $\text{Count}_{LIM\_HI}$ during cycle 2. However, the increased magnitude of the voltage $V_{AB}$ causes the improved count to drop below the lower count limit $\text{Count}_{LIM\_LO}$ at time $t=t_{EXC}$ during the negative interval of cycle 2. As in the sub-embodiment described in relation to FIG. 3, detection that the flux estimation (Count) reaches a count limit $\text{Count}_{LIM\_LO}$, $\text{Count}_{LIM\_HI}$ causes the flux controller 170 to provide an indication to the PWM generator 180 that any ongoing PWM pulse should be clamped. This results in the negative $V_{AB}$ pulse 433 during cycle 2 being shortened relative to the PWM pulse that would be generated if no high-flux condition were detected. While the flux estimation given by Count falls below the lower limit $\text{Count}_{LIM\_LO}$, the magnetic flux B of the transformer core 126 stays bounded within the flux limits $B_{SAT\_HI}$, $B_{SAT\_LO}$.

The above sub-embodiments describe that a Count used to estimate magnetic flux B may use a fixed increment/decrement or may use an increment/decrement determined by a voltage $V_{AB}$ sampled on each clock period of the Count. In yet another sub-embodiment, the increment/decrement may be based upon the voltage $V_{AB}$ (or the associated input voltage $V_{IN}$), but it may be sampled at a rate less than that of the clock used for the Count. For example, the voltage $V_{AB}$ (or the input voltage $V_{IN}$) may be sampled once per switching cycle, and the resultant voltage used by the counter for the next switching cycle. In a variant of this sub-embodiment, the voltage across $V_{AB}$ during positive and negative half cycles may be integrated or averaged, and the results used as the increment/decrement amount for the next switching cycle of the voltage converter.

Figure 5:
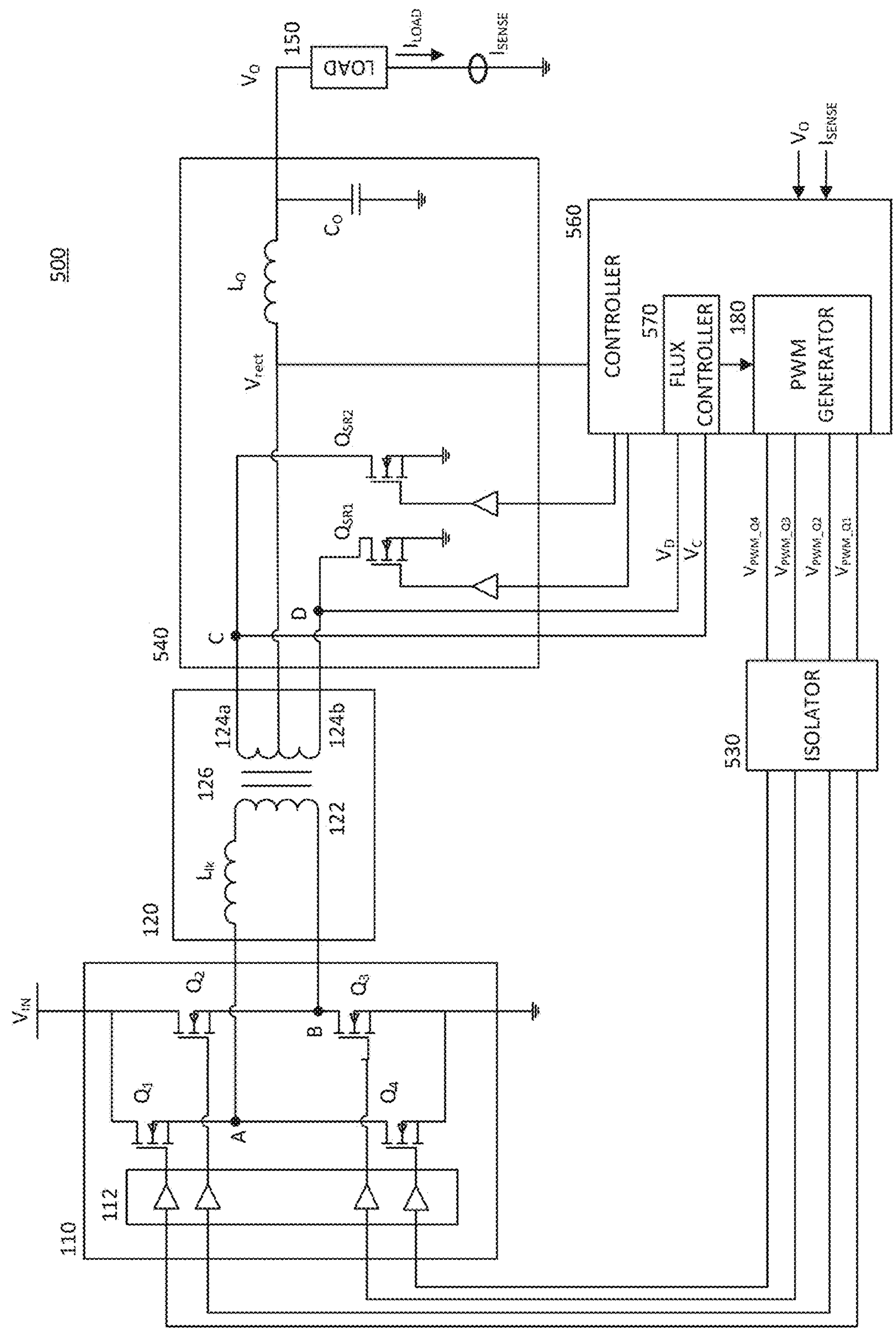
FIG. 5 illustrates a circuit diagram for a voltage converter similar to that of FIG. 1, except that the flux estimation within the voltage converter of FIG. 5 is based upon a voltage across the secondary windings of the transformer.

FIG. 5 illustrates a second embodiment of a voltage converter 500. Whereas the above sub-embodiments are based upon a first embodiment in which the magnetic flux B is estimated using the voltage $V_{AB}$ across the input to the transformer 120, the embodiment of FIG. 5 uses the voltage $V_{CD}$ across the secondary windings 124*a*, 124*b* of the transformer 120. The voltage converter 500 of FIG. 5 is similar to the voltage converter 100 of FIG. 1, and only those components that are significantly different are described below.

Because the flux estimation techniques of the voltage converter 500 do not use the voltage $V_{AB}$ corresponding to the transformer 120 input, the isolator 530 is simplified as it need not transfer voltages corresponding to nodes A and B from the primary to the secondary sides of the voltage converter 500. Voltages corresponding to nodes C and D are provided to a flux controller 570 within a controller 560. These voltages $V_C$, $V_D$ may be sensed within the conditioning circuit 540, within the transformer 120, or somewhere in between. The controller 560 and the flux controller 570 therein are largely the same as the corresponding circuits 160, 170 within the voltage converter 100 of the first embodiment, except as explained below.

The magnetic flux change for the transformer core 126 may be given by:

$$\Delta BN_2A=\int_{t_0}^{t0+T_x} v_{CD}(t)dt, \tag{8}$$

where $N_2$ is the number of turns in one of the secondary windings 124*a*, 124*b*, A is the cross-sectional area of the transformer 120, and $V_{CD}(t)$ is the voltage across the secondary windings 124*a*, 124*b* of the transformer 120.

Note that equation (8) represents a variation of equation (2), the variation being that the magnetic flux change ΔB is based upon parameters for the secondary side of the transformer 120 rather than on its primary side. Equation (8) can be converted into discrete time wherein the voltage $V_{CD}$ is sampled using a sample clock having a period T, thereby leading to:

$$\Delta BN_2A=T*\Sigma_{k_0}^{k0+K} v_{CD}(k), \text{ over the period from } k_0 \text{ to } k_0+K. \tag{9}$$

Sub-embodiments that estimate magnetic flux B based upon equation (9) may be implemented in a manner similar to the sub-embodiments described in conjunction with the voltage converter 100 of FIG. 1. For example, a sub-embodiment may use a counter that increments/decrements by a fixed amount, as described previously regarding FIG. 2, FIG. 3, and equation (4). Another sub-embodiment may use a counter that increments/decrements by a value corresponding to the secondary-side voltage $V_{CD}$, in a manner analogous to that described in relation to FIG. 4 and equation (6). Due to their similarities with the sub-embodiments of the first embodiment, these sub-embodiments of the second embodiment are not described in detail here. The techniques of the second embodiment are the same as those of the first embodiment except that the flux estimation, as implemented within the flux controller 570, is based upon the secondary-side voltage $V_{CD}$ and the turns $N_2$ of the secondary windings 124*a*, 124*b*. Note, also, that the count limits $\text{Count}_{LIM\_HI}$, $\text{Count}_{LIM\_LO}$, e.g., as given by equations (5) and (7), are altered to use the secondary-side parameters $V_{CD}$, $N_2$. The safety margin given by Δ may also need to be altered to account for, e.g., smaller voltages on the secondary side of the voltage converter 500 as compared to the primary side (for a step-down converter), and/or the differing delays in sensing the voltage across $V_{CD}$ as compared to $V_{AB}$.

Figure 6:
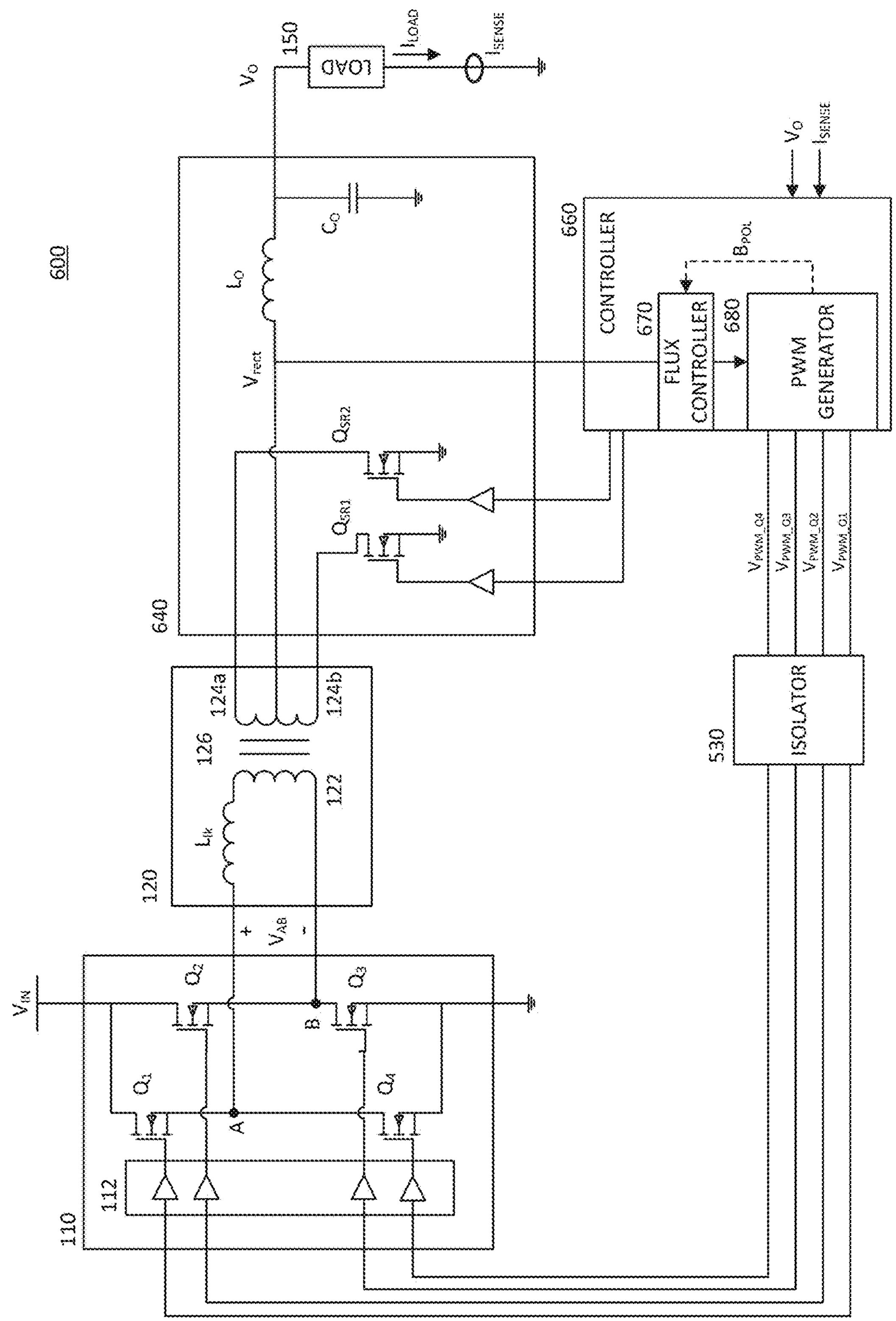
FIG. 6 illustrates a circuit diagram for a voltage converter similar to that of FIG. 5, except that the flux estimation within the voltage converter of FIG. 6 is based upon a rectified voltage on the secondary side of the voltage converter.

FIG. 6 illustrates a voltage converter 600 according to a third embodiment. This third embodiment uses voltages on the secondary side of the voltage converter 600 for estimating the magnetic flux within the transformer core 126. However, the voltage converter 600 of this embodiment uses a rectified voltage, such as $V_{rect}$, rather than a (signed) voltage $V_{CD}$ across the secondary winding, in estimating the magnetic flux B. This third embodiment is considered preferred since it does not require sensing additional voltages such as $V_{AB}$ or $V_{CD}$. As illustrated in FIG. 6, the rectified voltage $V_{rect}$ is already input to the controller 660 for purposes of voltage rectification. This voltage $V_{rect}$, may also be provided to the flux controller 670 where it can be used for flux estimation.

The rectified voltage $V_{rect}$, does not inherently indicate the polarity of the magnetic flux B within the transformer core 126. While the flux polarity could be found by sensing winding voltages $V_{AB}$ or $V_{CD}$, the polarity can more easily be obtained from the PWM generator 680. For example, the flux polarity $B_{POL}$ may be considered positive whenever $V_{PWM\_Q1}$ and $V_{PWM\_Q3}$ are high, i.e., corresponding to a positive voltage $V_{AB}$ input to the transformer 120, and negative whenever $V_{PWM\_Q2}$ and $V_{PWM\_Q4}$ are high, i.e., corresponding to a negative voltage $V_{AB}$ input to the transformer 120. Such a flux polarity indication $B_{POL}$ could be latched whenever there is a change in the PWM waveforms, and this indication may be provided by the PWM generator 680 to the flux controller 670 so that the flux controller 670 is aware of the flux polarity. In many embodiments including, e.g., where $B_{SAT\_LO}=-B_{SAT\_HI}$, it may not be necessary for the flux controller 670 to be aware of the flux polarity; the flux controller 670 could merely toggle between two polarities that it maintains.

In the following, sub-embodiments analogous to those described previously regarding the first embodiment will be described. Additional detail regarding the flux controller 670 and PWM generator 680 are provided in FIGS. 9 and 10, including techniques for balancing the magnetic flux. Note that this additional detail and the techniques described below are largely applicable to the first two embodiment also, but are described in this third embodiment as it is considered the preferred embodiment.

Figure 7:
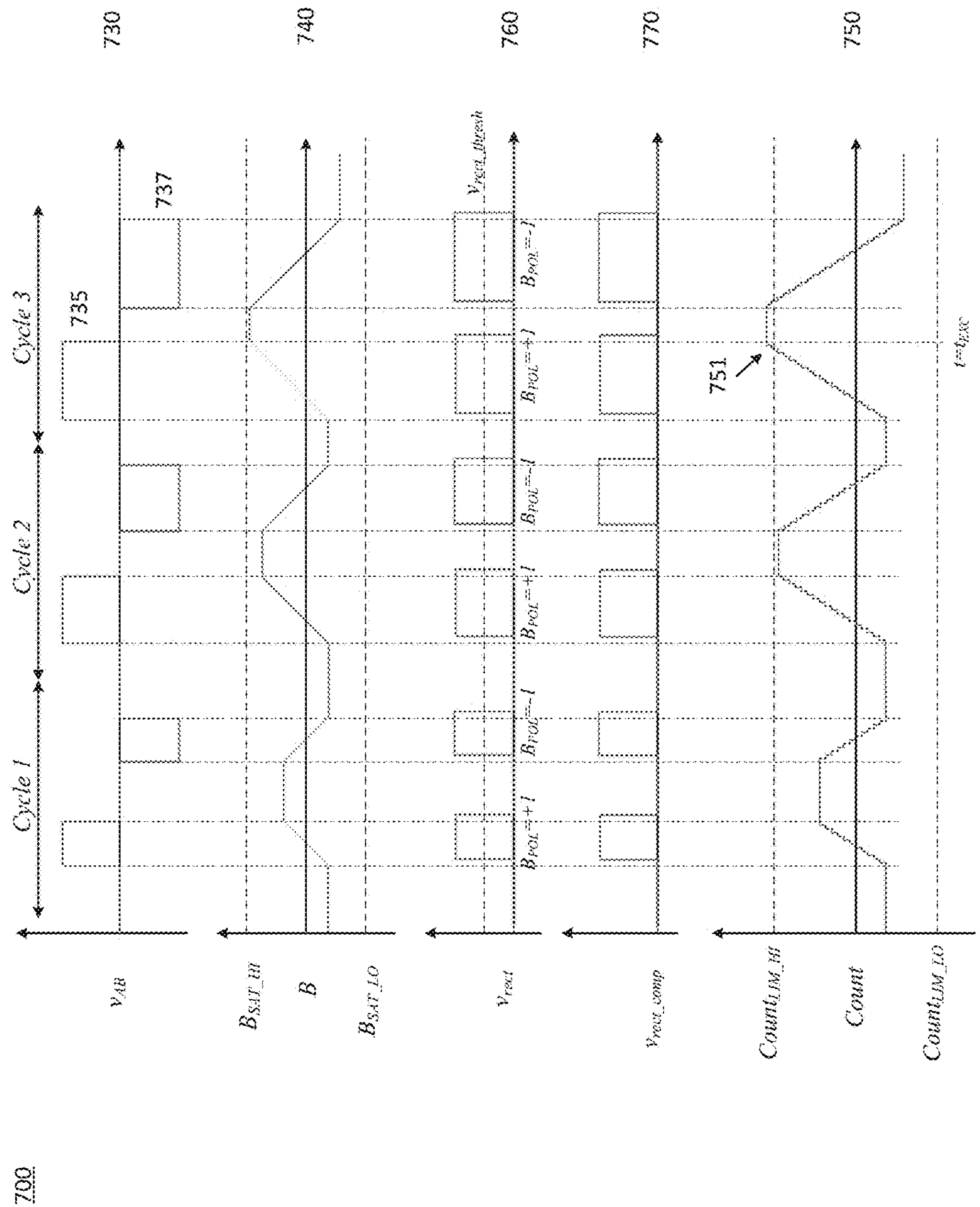
FIG. 7 illustrates waveforms for a transformer input voltage, actual magnetic flux of the transformer, a secondary-side rectified voltage, and a flux estimate based upon the rectified voltage, wherein the waveforms correspond to waveforms that may be found within the voltage converter of FIG. 6.

FIG. 7 illustrates the magnetic flux B in the transformer core 126 over three cycles of the voltage converter 600, as well as an estimation of the magnetic flux as tracked in the controller 660. The waveforms 700 of FIG. 7 are analogous to those of FIG. 3, but, for ease of illustration, the PWM waveforms are omitted in FIG. 7.

In a sub-embodiment of a voltage converter 600, it is presumed that the input source voltage $V_{IN}$ is constant and, therefore, the magnetic flux B may be estimated using a counter with a fixed increment/decrement. A waveform 730 corresponding to a voltage $V_{AB}$ output by the power stage 110 and input to the transformer 120 is illustrated over 3 cycles of the voltage converter 600. A load step caused by, e.g., an increased power requirement of the load 150 causes the increasing pulse durations illustrated. This leads to an increased magnitude of the magnetic flux B within the transformer core 126, as illustrated in the magnetic flux B waveform 740.

A secondary-side voltage $V_{CD}$ (not shown for ease of illustration) is rectified leading to a rectified voltage $V_{rect}$ having a waveform 760 as illustrated in FIG. 7. Note that the rectified voltage $V_{rect}$ is slightly delayed relative to the transformer 120 input voltage $V_{AB}$. The rectified voltage $V_{rect}$ is input to the flux controller 670 where it is compared against a threshold $V_{rect\_thresh}$, e.g., using a comparator circuit, to yield the binary output $V_{rect\_comp}$, as illustrated in the waveform 770. The threshold $V_{rect\_thresh}$ is chosen to be at some value between 0 and an expected value of $V_{rect}$ when this voltage is high.

A counter within the flux controller 670 increments when $V_{rect\_comp}$ is high and the flux polarity $B_{POL}$ is positive, and decrements when $V_{rect\_comp}$ is high and the flux polarity $B_{POL}$ is negative. The resultant Count is illustrated in the waveform 750, and serves to provide a first-order estimation of the magnetic flux 740. The flux controller 670 monitors the Count and, if it extends outside of the range between $Count_{LIM\_LO}$ and $Count_{LIM\_HI}$, a high-flux condition is detected. In response to such detection, the flux controller 670 indicates to the PWM generator 680 that any ongoing PWM pulses should be truncated so that power being input to the transformer 120 is curtailed. An example of this is shown in FIG. 7, wherein the Count waveform 750 exceeds the count limit $Count_{LIM\_HI}$ at a time instant 751, which is detected by the flux controller 670. The flux controller 670 indicates to the PWM generator 680 that any ongoing PWM pulses must be disabled immediately. Shortly thereafter, PWM waveforms (not shown for ease of illustration), such as $V_{PWM\_Q1}$ and $V_{PWM\_Q3}$ that control power switches $Q_1$, $Q_3$ within the power stage 110, are set low. This, in turn, shortens the positive pulse 735 of the transformer input voltage $V_{AB}$ during cycle 3, thereby stopping additional magnetic flux B from being induced into the transformer core 126. Provided the safety margin Δ is adequate, the described technique prevents the magnetic flux B from exceeding the saturation limit $B_{SAT\_HI}$. This is shown in the magnetic flux B waveform 740.

In a further sub-embodiment, there is no presumption that the input voltage $V_{IN}$ is constant, and the value of the rectified voltage $V_{rect}$ is used to account for the variation in the input voltage $V_{IN}$ and its effect on the magnetic flux B. Such an embodiment is analogous to that described for the first embodiment in conjunction with FIG. 4, with the primary difference being that the rectified voltage $V_{rect}$ must be assigned an appropriate polarity before being added to the Count. Such a Count may be given by:

$$\text{Count} = \Delta B N_2 A = T * \sum_{k_0}^{k_0+K} v_{rect}(k) * B_{POL}(k), \tag{10}$$

over the period from $k_0$ to $k_0+K$.

$$\text{wherein } B_{POL}(k) = \begin{cases} +1 \text{ for flux increases,} \\ -1 \text{ for flux decreases,} \end{cases}$$

$N_2$ is the number of turns in a secondary winding 124*a*, 124*b* and

A is the cross-sectional area of the transformer 120.

Note that the flux polarity $B_{POL}$ does not change within each pulse of the rectified voltage $V_{rect}$, and that the flux polarity $B_{POL}$ alternates from one pulse of the rectified voltage $V_{rect}$ to the next.

Figure 8:
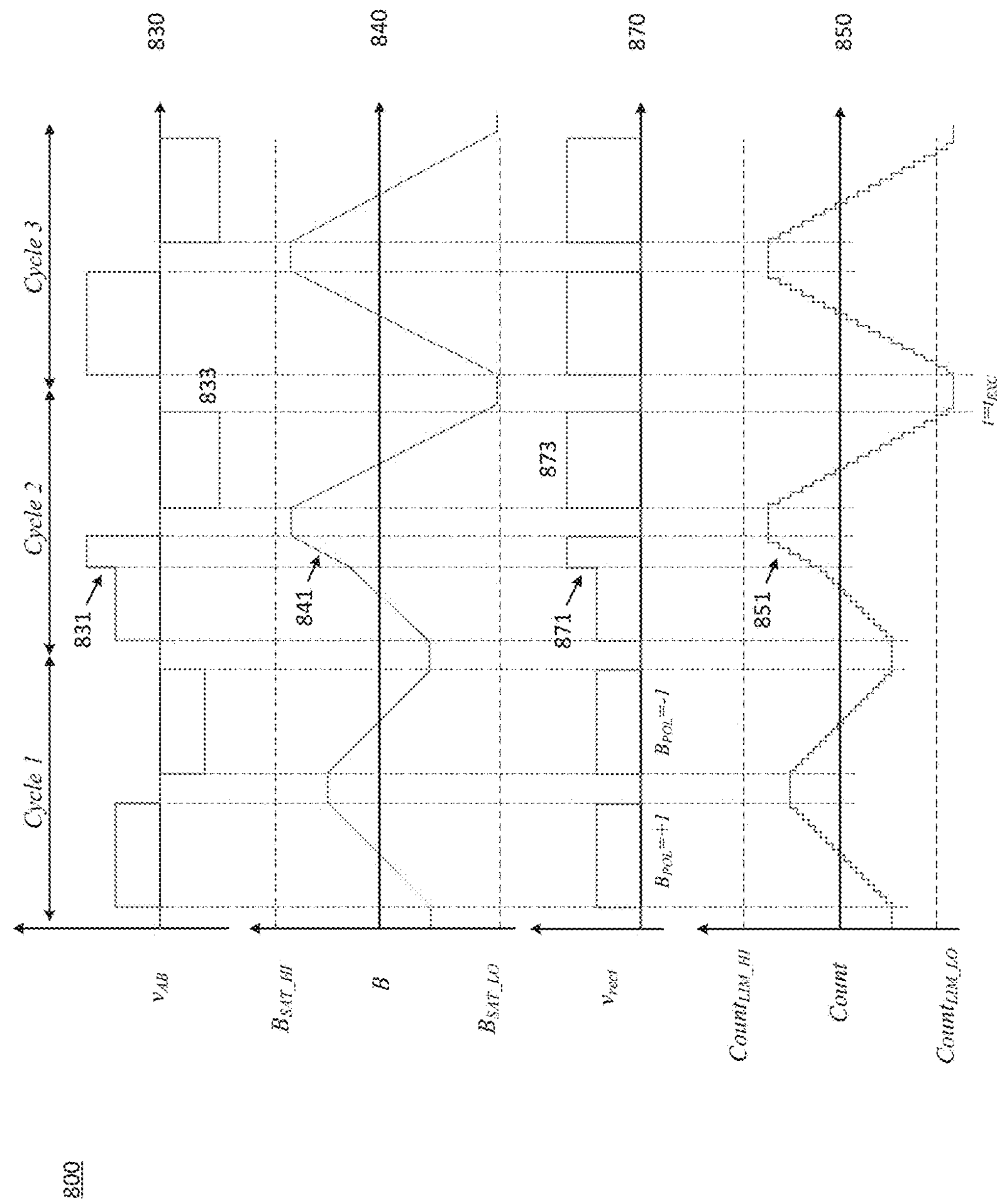
FIG. 8 illustrates waveforms similar to those of FIG. 7, but also illustrates a situation in which the input to the transformer includes a step increase in its voltage.

FIG. 8 illustrates waveforms 800 corresponding to the further sub-embodiment of the third embodiment. The voltage $V_{AB}$ provided to the transformer 120 has a step increase 831 in its value during a positive flux polarity of cycle 2, as shown in the $V_{AB}$ waveform 830. This causes an increase in the rate 841 at which the magnetic flux B is increasing as shown in the flux waveform 840, and also causes a step increase 871 in the rectified voltage $V_{rect}$, as shown in its waveform 870. The flux estimation 850 based upon a Count as given by equation (10) tracks 851 this increased magnetic flux B rate. The Count does not reach the upper count limit $Count_{LIM\_HI}$, during cycle 2. However, the increased magnitude of the voltage $V_{rect}$ causes the improved count to drop below the lower count limit $Count_{LIM\_LO}$ at time $t=t_{EXC}$ during the negative flux polarity of cycle 2. Detection that the flux estimation (Count) reaches a count limit $Count_{LIM\_LO}$, $Count_{LIM\_HI}$ causes the flux controller 670 to provide an indication to the PWM generator 680 that any ongoing PWM pulse should be truncated. This results in the negative $V_{AB}$ pulse 833 and the negative-flux rectified voltage $V_{rect}$ pulse 873 during cycle 2 being shortened relative to the pulses that would be generated if no high-flux condition were detected. While the flux estimation given by Count falls below the lower limit $Count_{LIM\_LO}$, the magnetic flux B of the transformer core 126 stays bounded within the flux limits $B_{SAT\_HI}$, $B_{SAT\_LO}$, i.e., the transformer core 126 does not reach a flux saturation level.

Figure 9:
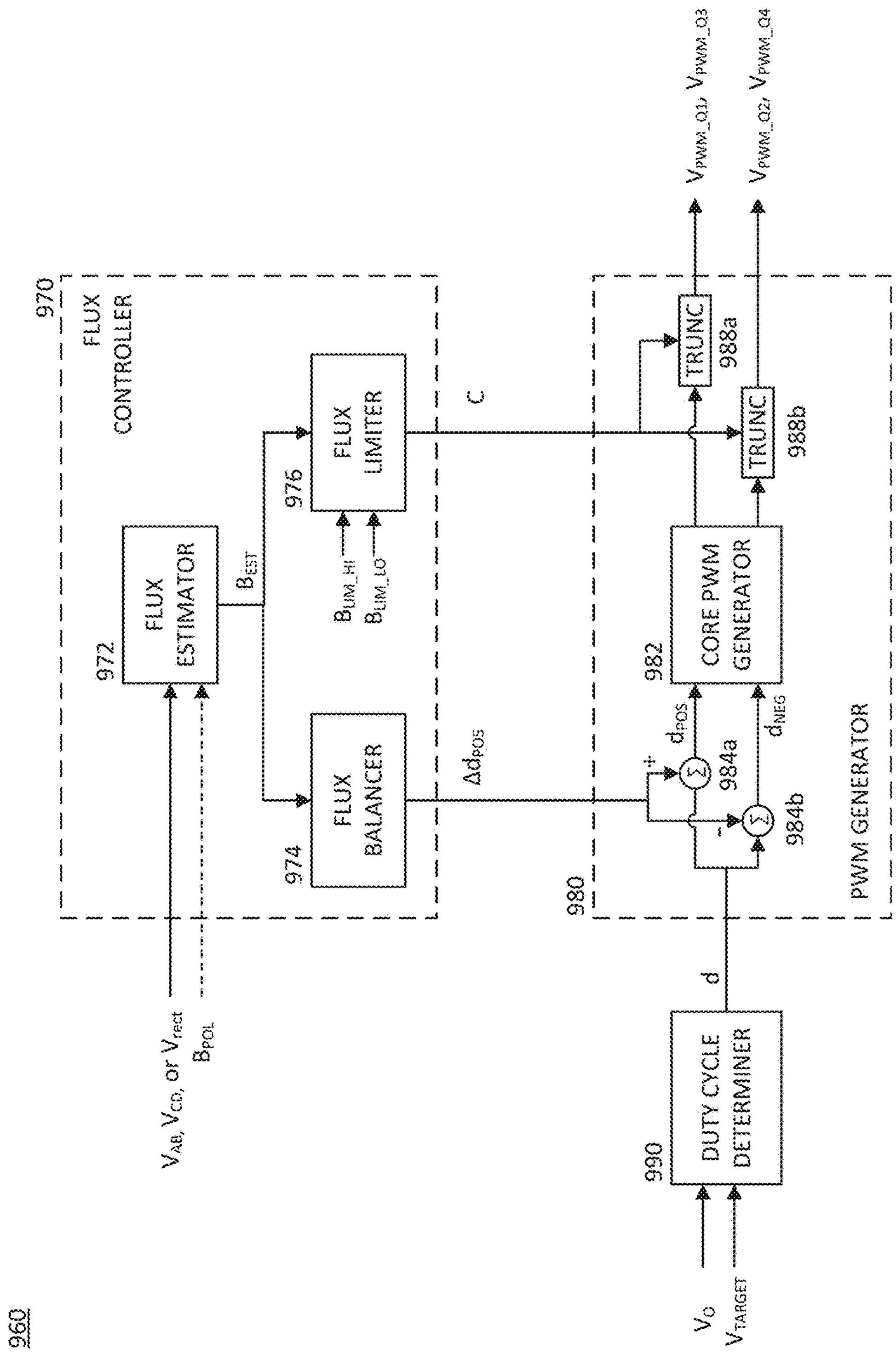
FIG. 9 illustrates a more detailed version of a flux controller and a PWM generator, as are included in the voltage converters of FIGS. 1, 5, and 6.

FIG. 9 illustrates a portion of a controller 960 such as that used in the voltage controller of the three embodiments described previously. In addition to limiting the magnetic flux B, the controller 960 also balances the positive and negative flux excursions in order to drive the long-term average flux to zero. The controller 960 of FIG. 9 includes a flux controller 970, a PWM generator 980, and a duty cycle determiner 990. The controller 960 of FIG. 9 may be implemented using electrical circuitry including processors and memory, as similarly explained regarding the controller 160 of FIG. 1. For ease of explanation, the controller 960 will be described as being part of the voltage converter 600 of FIG. 6, but it should be understood that the techniques implemented within the controller 960 could similarly be incorporated into the voltage converters 100, 500 of FIGS. 1 and 5.

The duty cycle determiner 990, which may be part of the PWM generator 980 in some implementations, uses the output load voltage $V_O$ to determine a duty cycle (d) for the PWM generator 980. In a typical implementation, the output load voltage $V_O$ is compared against a target voltage $V_{TARGET}$ to generate an error voltage $V_{ERR}$ (not shown). This error voltage $V_{ERR}$ then feeds a duty cycle controller, such as a proportional-integral-derivative (PID) controller (not shown for ease of illustration), which determines whether the duty cycle (d) should be increased or decreased and by how much. Because the operation of PID controllers is well-known in the art, such conventional operation are not described further herein. The resultant duty cycle (d) is typically updated once per switching cycle of the voltage converter 600, and provided to the PWM generator 980. Note that the target voltage $V_{TARGET}$ is typically stored within a memory of the controller 960, and may be set during a configuration or calibration of the voltage converter 600.

The flux controller 970 includes a flux estimator 972, a flux balancer 974, and a flux limiter 976. The flux estimator 972 inputs one or more of an input voltage $V_{AB}$ from the primary side of a voltage converter, a voltage $V_{CD}$ across the secondary winding of a voltage converter, and a rectified voltage $V_{rect}$ on the secondary side of a voltage converter. A flux polarity $B_{POL}$ may also be provided to the flux estimator 972, e.g., from the PWM generator 980, in some implementations, e.g., those in which the rectified voltage $V_{rect}$ is used for estimating magnetic flux B. The flux estimator 972 estimates the magnetic flux B within the transformer core 126 based upon the input voltage. The flux estimate $B_{EST}$ may be determined based upon a Count having a fixed increment/decrement, or on a Count having increment/decrement values determined by the input voltage. Such techniques for estimating the flux B are as described in the voltage converters 100, 500, 600 of FIGS. 1, 5, and 6. The estimated flux $B_{EST}$ is provided to the flux balancer 974 and the flux limiter 976.

The flux limiter 976 uses the flux estimate $B_{EST}$ (e.g., Count) to detect a high-flux condition. Such detection techniques are described above for the voltage converters 100, 500, 600 of FIGS. 1, 5, and 6, and, hence, such techniques will only be briefly summarized here.

Flux limits $B_{LIM\_HI}$, $B_{LIM\_LO}$ are provided to or stored within the flux limiter 976. These limits $B_{LIM\_HI}$, $B_{LIM\_LO}$ may be stored within a memory of the flux limiter 976, or within a memory otherwise located within the controller 960. As explained regarding the voltage converters 100, 500, 600 of FIGS. 1, 5, and 6, count limits $Count_{LIM\_HI}$, $Count_{LIM\_LO}$, which are examples of $B_{LIM\_HI}$, $B_{LIM\_LO}$, are determined based upon parameters such as a flux saturation limit $B_{SAT}$ of a transformer core, the turns (e.g., N1, N2) within windings of a transformer, and a safety margin Δ. Typically, the limits $B_{LIM\_HI}$, $B_{LIM\_LO}$ have the same magnitude, but are of opposite polarity.

The flux limiter 976 monitors the flux estimate $B_{EST}$ (e.g., Count) and constantly compares it against the flux limits $B_{LIM\_HI}$, $B_{LIM\_LO}$ (e.g., $Count_{LIM\_HI}$, $Count_{LIM\_LO}$). If the flux estimate $B_{EST}$ falls outside of the range $\{B_{LIM\_HI}, B_{LIM\_LO}\}$ indicated by the flux limits, the flux limiter 976 provides an indication C that any active PWM pulse needs to be immediately truncated (clamped), so as to disable all power switches and, in turn, curtail any power from being input to the transformer 120. Note that while the flux limiter 976 serves to protect against flux saturation in the transformer 120, the described clamping of the PWM waveforms reduces the power being supplied to the load 150 of the voltage converter 600, and may serve to create a non-zero bias in the average flux within the transformer core 126. These problems may be at least partially mitigated by actively balancing the positive and negative flux excursions.

The flux balancer 974 uses the provided flux estimate $B_{EST}$ to generate a duty cycle adjustment $\Delta d_{POS}$ that is used to remove any bias in the long-term magnetic flux, i.e., to drive the average flux to zero. In an exemplary technique, the flux balancer 974 latches a peak positive value $B_{MAX\_EST}$ of the flux estimate $B_{EST}$ and a peak negative value $B_{MIN\_EST}$ of the flux estimate $B_{EST}$ for each cycle of the voltage converter 600. This may be accomplished by monitoring the flux estimate $B_{EST}$ and storing these peaks, or the peak values $B_{MAX\_EST}$, $B_{MIN\_EST}$ may be latched using edges of a voltage $V_{AB}$, $V_{CD}$, $V_{rect}$ or using edges of the PWM waveforms, e.g., $V_{PWM\_Q1}$, $V_{PWM\_Q2}$. A difference in the peak values is generated for each switching cycle, e.g., $\Delta B = B_{MAX\_EST} - B_{MIN\_EST}$. This difference ΔB is integrated or low-pass filtered over several switching cycles to generate a filtered difference $\Delta B_{FILT}$. The filtered difference $\Delta B_{FILT}$ is then used to generate a duty cycle adjustment $\Delta d_{POS}$, which is provided to the PWM generator 980. If the filtered difference $\Delta B_{FILT}$ is zero, then the flux is perfectly balanced between positive and negative half cycles, and the duty cycle adjustment $\Delta d_{POS}$ may be left at zero. If the filtered difference $\Delta B_{FILT}$ is positive, this indicates a positive flux bias that needs to be compensated by reducing the time interval when positive voltage is applied across the input $V_{AB}$ to the transformer 120. This is accomplished by setting the positive duty cycle adjustment $\Delta d_{POS}$ to a negative value, thereby reducing the duty cycle of the positive interval and, correspondingly, increasing the duty cycle of the negative interval. (Within a switching cycle, the net energy transfer and the average duty cycle is not changed by the balancing.) The amount of the duty cycle adjustment $\Delta d_{POS}$ may be determined as a function of the filtered difference $\Delta B_{FILT}$, e.g., $\Delta d_{POS} = f(\Delta B_{FILT})$, via table look-up or via a similar mapping technique.

The PWM generator 980 includes a core PWM generator 982, duty cycle adjustment summation circuits 984*a*, 984*b*, and PWM waveform truncation/clamping circuits 988*a*, 988*b*. The duty cycle adjustment summers 984*a*, 984*b* input the duty cycle d and the duty cycle adjustment $\Delta d_{POS}$, and generate separate duty cycles $d_{POS}$, $d_{NEG}$ for the positive and negative intervals of a switching cycle. The average of the separate duty cycles $d_{POS}$, $d_{NEG}$ for a given switching cycle is the same as the duty cycle d, i.e., the duty cycle adjustment $\Delta d_{POS}$ effectively shifts energy between the positive and negative intervals of a switching cycle, but does not change the overall energy provided during that switching cycle.

The core PWM generator 982 inputs the separate duty cycles $d_{POS}$, $d_{NEG}$ and uses these to generate PWM waveforms. The truncation circuits 988*a*, 988*b* input the PWM waveforms from the core PWM generator 982 and, if instructed by the flux limiter 976 signal C, clamp pulses within the PWM waveforms.

The controller 960 described above serves to prevent flux saturation within the transformer core 126 by implementing a fast-acting clamp of the PWM waveforms $V_{PWM\_Q1}$, $V_{PWM\_Q2}$, $V_{PWM\_Q3}$, $V_{PWM\_Q4}$ that are used for switching power to the transformer 120, and to balance the magnetic flux B by implementing a slow-acting balancing of the flux using a filtered flux estimate $\Delta B_{FILT}$. However, any clamping of the PWM waveforms $V_{PWM\_Q1}$, $V_{PWM\_Q2}$, $V_{PWM\_Q3}$, $V_{PWM\_Q4}$ will deny needed and expected power to the load 150 of the voltage converter 600, at least temporarily. In addition to the undesired consequence that the output voltage $V_O$ will drop, the duty cycle determiner 990 (e.g., PID controller) will attempt to compensate for this voltage drop as if it were caused by a change in the load requirements. The net effect of these actions is that transients (including, potentially, oscillations) will be induced on the output voltage $V_O$ when the PWM waveforms are clamped. In an improved controller, the clamping of a PWM pulse is also accompanied by a duty cycle adjustment to compensate for the clamped pulse, and, thereby, more immediately balance the flux between positive and negative excursions.

Figure 10:
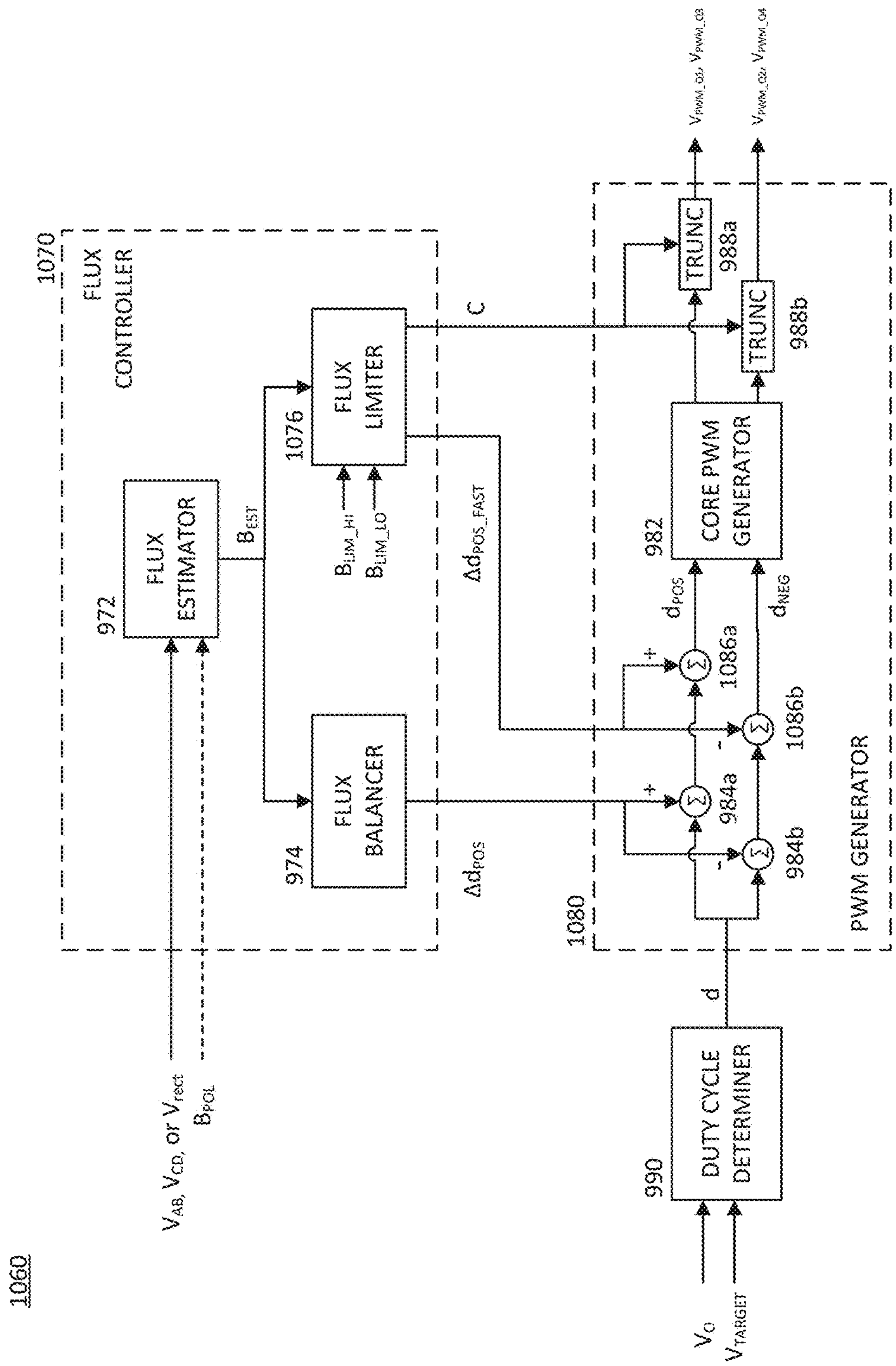
FIG. 10 illustrates a flux controller and PWM generator similar to those of FIG. 9, but also including a fast duty cycle adjustment.

FIG. 10 illustrates a controller 1060 that is largely the same as the controller 960 of FIG. 9, and the common circuits therein will not be described below. In addition to generating a clamping indication signal C, the flux limiter 1076 also generates a duty cycle adjustment $\Delta d_{POS\_FAST}$. Rather than merely curtailing power from being input to the transformer 120 and/or waiting for the slow-acting flux balancer 974 to balance the positive and negative flux excursions, the duty cycle adjustment $\Delta d_{POS\_FAST}$ serves to more immediately compensate for a clamped PWM pulse. To provide an explicit example, consider a situation in which the positive PWM pulse interval within a cycle of the voltage converter 600 is reduced by 10% due to the clamping indication signal C. In conjunction with this, the flux limiter 1076 would also generate a duty cycle adjustment $\Delta d_{POS\_FAST}$ indicating that the negative PWM pulse interval within that cycle should be increased by 10%. By effectively shifting energy transfer from the positive to the negative interval, the overall energy transfer through the transformer 120 during the switching cycle is unaffected by the clamping. While this more immediate balancing reduces the burden of the (slow-acting) flux balancer 974, the flux balancer 974 is still necessary to correct imbalance caused by anomalies other than detection of a high-flux condition and clamping of the output PWM waveforms $V_{PWM\_Q1}$, $V_{PWM\_Q2}$, $V_{PWM\_Q3}$, $V_{PWM\_Q4}$. For example, load steps that are small enough to not cause high-flux conditions may still cause imbalance which should be corrected, and voltage bias on the transformer input may cause imbalance which should be corrected.

The PWM generator 1080 is modified such that it inputs and uses the fast-acting duty cycle adjustment $\Delta d_{POS\_FAST}$. As illustrated in FIG. 10, additional summation circuits 1086*a*, 1086*b* are used to adjust the positive and negative duty cycles $d_{POS}$, $d_{NEG}$. Other techniques for making this duty cycle adjustment are also possible. For example, the slow-acting duty cycle adjustment $\Delta d_{POS}$ and the fast-acting duty cycle adjustment $\Delta d_{POS\_FAST}$ could be summed before being provided to the PWM generator 1080.

The above embodiments are described in the context of a full-bridge voltage converter in which the power input to a transformer is controlled by the duty cycles of PWM waveforms that control power switches. Of particular note, and as illustrated in the waveforms 300 of FIG. 3 which may be generated by the voltage converter 100 of FIG. 1, the PWM waveforms $V_{PWM\_Q1}$, $V_{PWM\_Q3}$ that enable power switches $Q_1$ and $Q_3$ are both high at the same time and both low at the same time. In fact, a single generated waveform could be used to control both of these power switches $Q_1$, $Q_3$. Likewise, the PWM waveforms $V_{PWM\_Q2}$, $V_{PWM\_Q4}$ that enable power switches $Q_2$ and $Q_4$ are both high at the same time and both low at the same time. The power input to the transformer 120 is controlled by adapting the duty cycles of these waveforms $V_{PWM\_Q1}$, $V_{PWM\_Q3}$, $V_{PWM\_Q2}$, $V_{PWM\_Q4}$. However, it should be recognized that other techniques for controlling the power input to the transformer 120 may also be used in conjunction with the flux estimation and overflux protection techniques described above. Such other techniques for controlling power input, e.g., phase-shifted control, have advantages such as zero-voltage switching (ZVS) in some applications.

Figure 11:
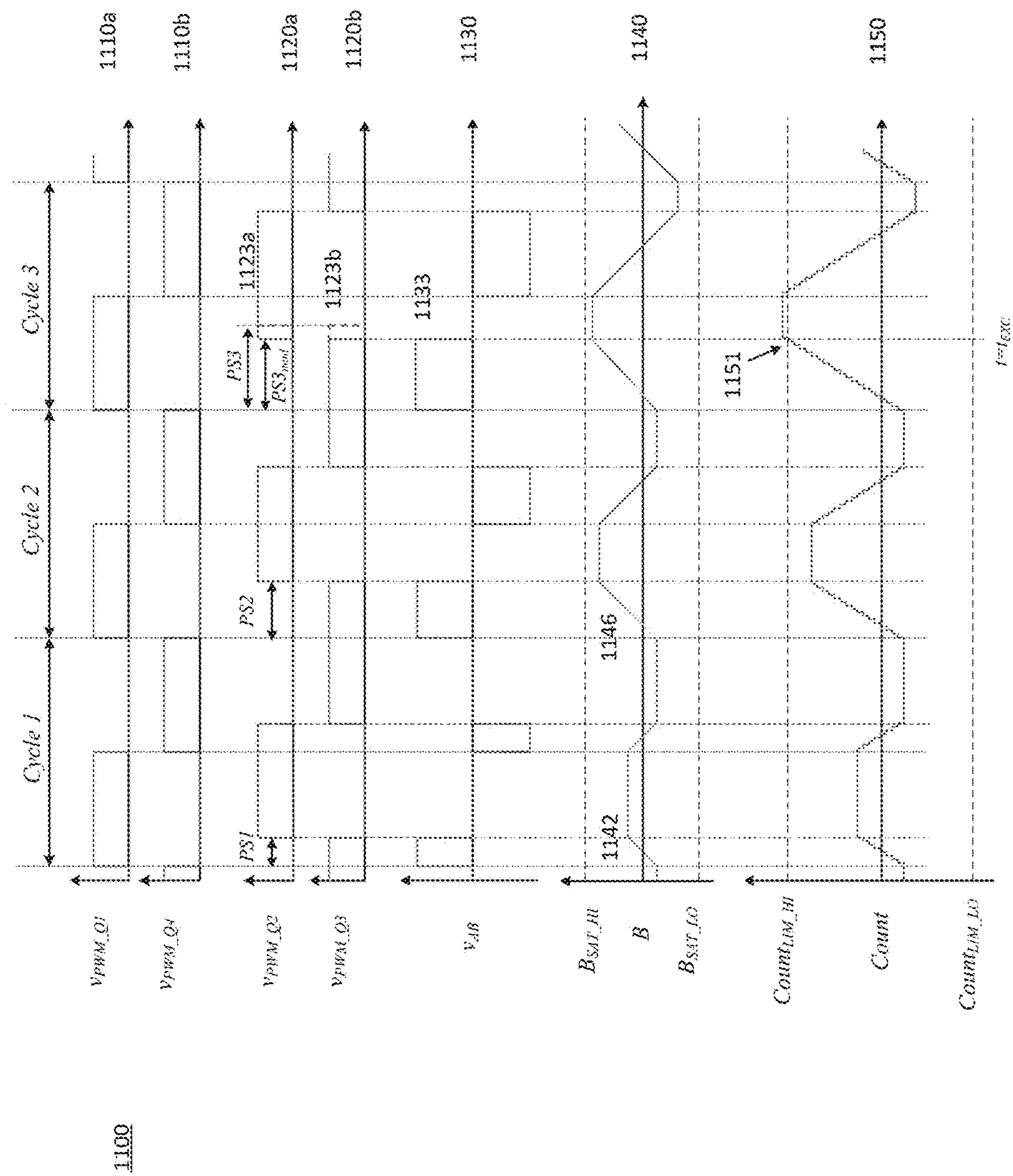
FIG. 11 illustrates PWM waveforms similar to those of FIG. 3, except that the waveforms are phase shifted to control the amount of power transfer, rather than using duty cycles to control the amount of power transfer.

FIG. 11 illustrates waveforms 1100 in which a type of phase shifting of the PWM waveforms $V_{PWM\_Q1}$, $V_{PWM\_Q4}$, $V_{PWM\_Q2}$, $V_{PWM\_Q3}$ is used to control the power input to the transformer 120. The PWM waveform 1110*a* for $V_{PWM\_Q1}$, which controls power switch $Q_1$, has a nominally fixed duty cycle (e.g., 50%). The PWM waveform 1110*b* for $V_{PWM\_Q4}$, which controls power switch $Q_4$, is an inverted version of the PWM waveform 1100*a* for $V_{PWM\_Q1}$. Similarly, the PWM waveforms 1120*a*, 1120*b* for $V_{PWM\_Q2}$, $V_{PWM\_Q3}$ are inverted versions of each other. The PWM waveform 1120*a* for $V_{PWM\_Q2}$ is nominally a delayed (phase shifted) version of the PWM waveform 1110*a* for $V_{PWM\_Q1}$. The amount of the phase shift (delay) for a given cycle of the voltage converter determines the energy transfer to the transformer 120 during that cycle. The PWM waveforms 1100 show 3 cycles, each having a corresponding phase shift PS1, PS2, PS3, wherein the power transfer is increasing over time as the result of, e.g., an increased power requirement of the load 150. The PWM waveforms 1110*a*, 1110*b*, 1120*a*, 1120*b* lead to the transformer input voltage $V_{AB}$, which has a waveform 1130 as illustrated in FIG. 11.

The waveforms 1130, 1140, 1150 for the voltage $V_{AB}$, magnetic flux B, and flux estimate Count are largely the same as the waveforms 330, 340, 350 of FIG. 3. The flux estimate Count may be determined based upon the transformer input voltage $V_{AB}$, the transformer secondary voltage $V_{CD}$, or some other voltage, e.g., $V_{rect}$, in the conditioning circuit 140, as described in the prior embodiments. At time $t=t_{EXC}$, the flux controller 170, 570, 670 detects that the flux estimate Count has exceeded a flux limit $Count_{LIM\_HI}$. The flux controller 170, 570, 670 indicates this high-flux condition 1151 to the PWM generator 180, 580, 680 which, in response, truncates the pulse 1123*b* that starts in cycle 2 of the PWM waveform 1120*a* for $V_{PWM\_Q3}$. Because the PWM waveform 1120*a* for $V_{PWM\_Q3}$ is an inverted version of the PWM waveform 1120*a* for $V_{PWM\_Q3}$, the rising edge of the $V_{PWM\_Q3}$ pulse 1123*a* during cycle 3 is advanced in conjunction with this truncation. Stated alternatively, the phase shift PS3 that would normally be generated for the PWM waveforms 1120*a*, 1120*b* for $V_{PWM\_Q2}$ $V_{PWM\_Q3}$ during cycle 3 is modified to yield the reduced phase shift $PS3_{mod}$. The modified phase shift $PS3_{mod}$ (truncated PWM pulses), in turn, causes a truncation of the voltage pulse 1133 supplied to the transformer input $V_{AB}$. Because this pulse 1133 is shortened, energy transfer to the transformer 120 is curtailed, and the magnetic flux density B of the transformer core 126 stays bounded within the saturation limits $B_{SAT\_HI}$, $B_{SAT\_LO}$. (Note that small delays are incurred between detecting the high flux condition, truncating the PWM pulse 1113a, and truncating the $V_{AB}$ pulse. For ease of illustration, these delays are not shown.)

As described above and illustrated in FIG. 11, the PWM waveforms 1120a, 1120b for $V_{PWM\_Q2}$ $V_{PWM\_Q3}$ are modified to limit the transformer flux B. Alternatively, the PWM waveforms 1110a, 1110b for $V_{PWM\_Q1}$ $V_{PWM\_Q4}$ could be modified. Such an alternative is not preferred in most applications, as typical phase-shift control already alters the PWM waveforms 1120a, 1120b for $V_{PWM\_Q2}$ $V_{PWM\_Q3}$ for controlling the power to a load 150. Requiring modification of the PWM waveforms 1110a, 1110b for $V_{PWM\_Q1}$ $V_{PWM\_Q4}$ may not be feasible in such applications.

Note that the flux balancing techniques described in conjunction with FIGS. 9 and 10 are also applicable to voltage converters using phase-shift control, by mapping the phase shifts (e.g., PS1, PS2, PS3) into duty cycles and slow-acting duty cycle adjustments (e.g., $\Delta d_{POS}$), and phase shift modifications (e.g., PS3-PS3$_{mod}$) into fast-acting duty cycle adjustments (e.g., $\Delta d_{POS\_FAST}$).

The above embodiments have been described in the context of a full-bridge voltage converter. However, the overflux protection and flux balancing techniques described above are also applicable to other isolated topologies. The incorporation of these techniques into an active clamp forward (ACF) voltage converter are described next. Note that these techniques make use of a rectified voltage $V_{rect}$, in much the same manner as the full-bridge voltage converter 600 of FIG. 6. Only those aspects of the ACF voltage converter that are markedly different from that of the full-bridge converter 600 are described below. Also note that ACF voltage converters are well known in the art, and, hence, their conventional operation is not described in detail.

Figure 12:
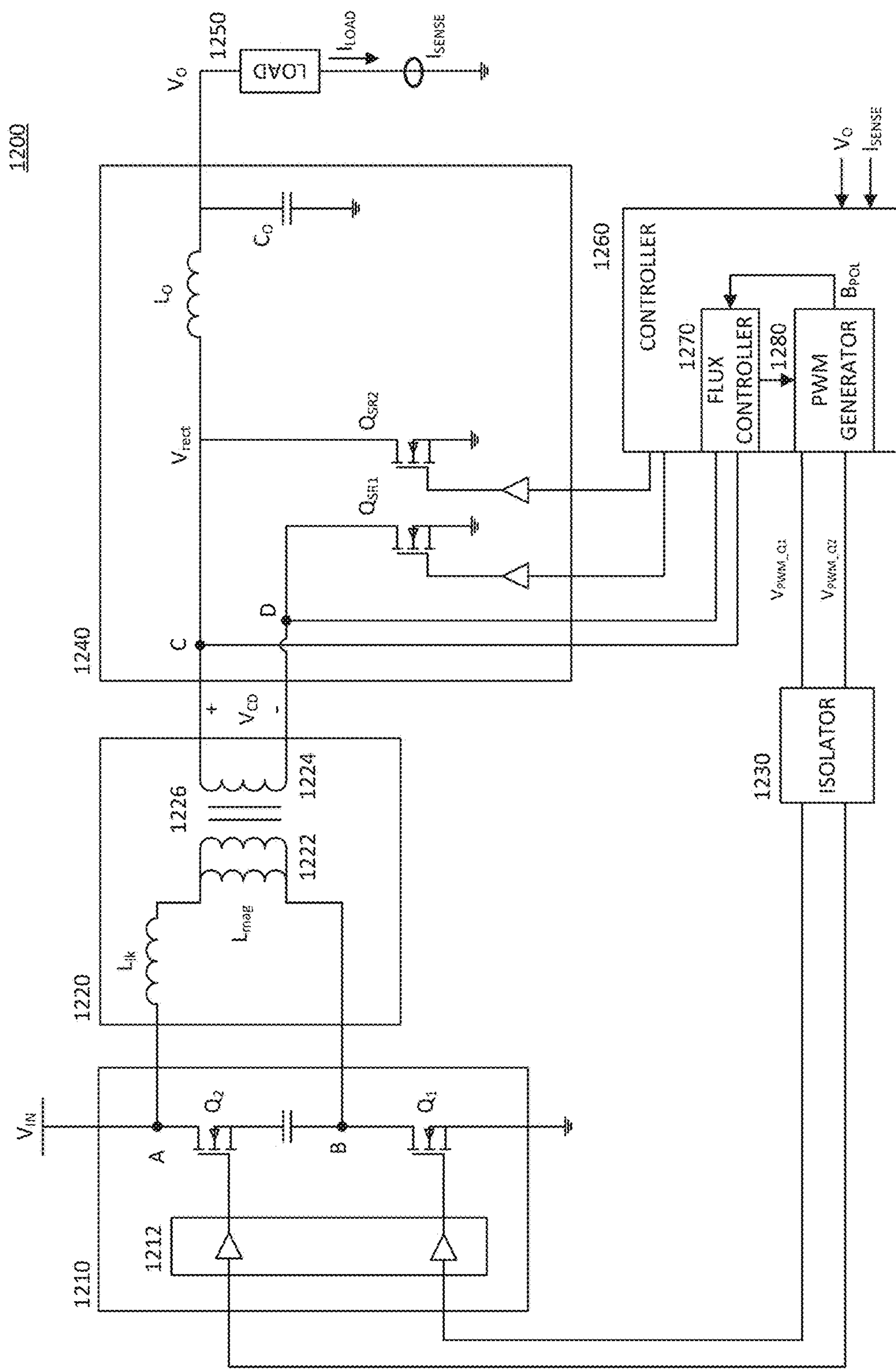
FIG. 12 illustrates a voltage converter using an active clamp forward (ACF) topology, and which uses flux estimation and overflux prevention techniques as described for the full-bridge voltage converters.

The ACF voltage converter 1200 of FIG. 12 includes a power stage 1210, a transformer 1220, an isolator 1230, a conditioning circuit 1240, and a controller 1260. An input power source $V_{IN}$ provides power to the voltage converter 1200, and the voltage converter 1200 supplies output power to a load 1250.

The power stage 1210 includes power switches $Q_1$, $Q_2$, and a driver stage 1212 for driving the power switches $Q_1$, $Q_2$. The power switches $Q_1$, $Q_2$, are controlled to provide power to the transformer 1220. The transformer 1220 is modelled as having a leakage inductance $L_{lk}$ and a magnetizing inductance $L_{mag}$. The transformer 1220 includes a primary winding 1222 having $N_1$ turns, a secondary winding 1224 having $N_2$ turns, and a core 1226. The isolator 1230 buffers PWM waveforms $V_{PWM\_Q1}$, $V_{PWM\_Q2}$ that are generated by the controller 1260 and that control the power switches $Q_1$, $Q_2$ within the power stage 1210. The conditioning circuit 1240 rectifies the voltage provided on the secondary side of the transformer 1220 using power switches $Q_{SR1}$ and $Q_{SR1}$. The conditioning circuit 1240 also filters the rectified voltage $V_{rect}$ using inductor $L_O$ and capacitor $C_O$, and provides a filtered voltage $V_O$ to the load 1250. The controller 1260 provides control signals to the power switches $Q_{SR1}$ and $Q_{SR1}$ for the voltage rectification, and the PWM generator 1280 therein generates the PWM waveforms $V_{PWM\_Q1}$, $V_{PWM\_Q2}$. The controller 1260 also includes a flux controller 1270 that detects high-flux conditions and, in conjunction with the PWM generator 1280, limits the flux being input to the transformer 1220.

The flux controller 1270 is similar to the flux controller 670 of FIG. 6. However, the measured rectified voltage $V_{rect}$ of FIG. 12 is not sufficient for flux estimation. The flux controller 1270 also measures a voltage corresponding to the drain-source voltage $V_{ds}$ across the rectification power switch $Q_{SR1}$. (The rectified voltage $V_{rect}$ and/or the drain-source voltage $V_{ds}$ may need to be shifted, e.g., using a resistor divider, before being input to the controller 1260. For ease of illustration, this is not shown.) The flux estimation is then based upon the difference between the rectified voltage $V_{rect}$ and the drain-source voltage $V_{ds}$. This voltage difference corresponds to the voltage $V_{CD}$ across the secondary winding 1224 of the transformer 1220. The flux controller 1260 uses the voltage difference (corresponding to the voltage $V_{CD}$) to estimate the magnetic flux using techniques as described regarding the flux controller 670 of FIG. 6. The estimated magnetic flux is then used to detect high-flux conditions and, responsive to such detection, to modify the PWM waveforms generated by PWM generator 1280 in order to prevent flux saturation in the transformer core 1226.

Figure 13:
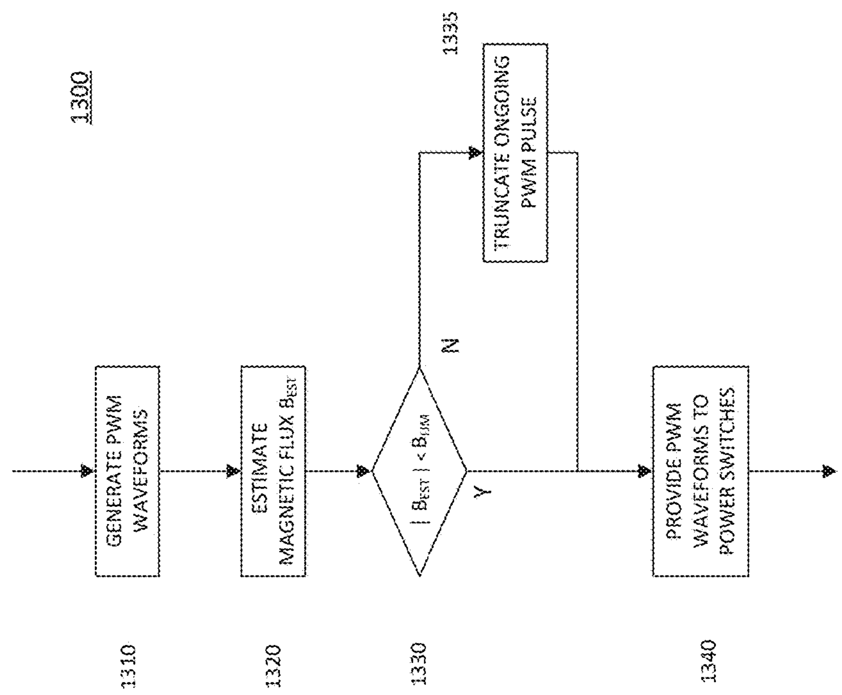
FIG. 13 illustrates a method within a voltage converter for estimating flux within a transformer of the voltage converter and for avoiding flux saturation within the transformer.

FIG. 13 illustrates a method 1300 for avoiding magnetic flux saturation within a transformer of a voltage converter. This method may be implemented, e.g., within a controller of the voltage converter. The techniques of this method 1300 are similar to those described above regarding the voltage converters 100, 500, 600, 1100, 1200 of FIGS. 1, 5, 6, 11 and 12.

In a first step 1310, PWM waveforms are generated for controlling one or more power switches within the voltage converter. Each of these PWM waveforms is comprised of a series of PWM pulses, wherein at least one of the duty cycle, switching frequency, and phase shifting of the PWM waveforms determines the amount of power transferred to the transformer. The magnetic flux within the transformer is estimated 1320 based upon a voltage across the primary winding of the transformer and/or a voltage within a conditioning circuit coupled to the secondary side of the transformer, in order to generate a magnetic flux estimate $B_{EST}$. The magnitude of the flux estimate $B_{EST}$ is compared 1330 against a flux limit $B_{LIM}$ to determine if a saturation flux level is being approached. If the magnitude of the flux estimate $B_{EST}$ exceeds the flux limit $B_{LIM}$, corrective actions are taken to curtail power from being provided to the transformer. More particularly, any ongoing PWM pulse(s) within the PWM waveforms is (are) truncated 1335 in this situation. After the PWM pulse truncation 1335 or if no truncation is needed, the PWM waveforms are provided 1340 to the power switches in order to control the power being provided to the transformer.

As used herein, the terms “having”, “containing”, “including”, “comprising” and the like are open-ended terms that indicate the presence of stated elements or features, but do not preclude additional elements or features. The articles “a”, “an” and “the” are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A voltage converter, comprising:

a power stage coupled to an input power source, the power stage comprising one or more power switches;

a transformer comprising a primary winding coupled to the power stage, and a secondary winding;

a conditioning circuit coupling the secondary winding to an output node that is operable to supply power to a load of the voltage converter; and a controller operable to:

generate pulse-width modulated (PWM) waveforms for controlling the one or more power switches, wherein each of the PWM waveforms is comprised of a series of PWM pulses;

estimate magnetic flux within the transformer based upon at least one of a voltage across the primary winding and a voltage within the conditioning circuit;

detect an overflux condition in which a magnitude of an estimated magnetic flux has exceeded a flux magnitude limit for the transformer; and responsive to detecting the overflux condition, truncate a pulse within the series of PWM pulses of the PWM waveforms before the PWM waveforms are provided to the one or more power switches.

2. The voltage converter of claim 1, wherein the controller is operable to estimate the magnetic flux based upon the voltage across the primary winding.

3. The voltage converter of claim 2, wherein the estimation of the magnetic flux is performed by:

generating or inputting a clock signal having a clock frequency and a corresponding period; and, for each period of the clock signal:

measuring a primary voltage across a first and a second terminal of the primary winding, wherein the primary voltage is a signed quantity; and adding the primary voltage to a volt-second value that represents the estimated magnetic flux.

4. The voltage converter of claim 2, wherein the estimation of the magnetic flux is performed by:

generating or inputting a clock signal having a clock frequency and a corresponding period;

classifying the voltage across the primary winding as being within a first polarity pulse interval, a second polarity pulse interval, or an inactive interval, wherein the first and second polarities are opposite to each other; and for each period of the clock signal:

increasing a flux count by a flux amount responsive to the voltage across the primary winding being classified within the first polarity pulse interval, and decreasing the flux count by the flux amount responsive to the voltage across the primary winding being classified within the second polarity pulse interval, wherein the flux count represents the estimated magnetic flux.

5. The voltage converter of claim 4, wherein the flux amount is determined by measuring the voltage across the primary winding at a rate that is less than that of the clock frequency.

6. The voltage converter of claim 1, wherein the controller is operable to estimate the magnetic flux based upon the voltage within the conditioning circuit, the voltage within the conditioning circuit corresponding to a secondary voltage across a first and a second terminal of the secondary winding.

7. The voltage converter of claim 6, wherein the secondary voltage is a signed value and the estimation of the magnetic flux is performed by:

generating or inputting a clock signal having a clock frequency and a corresponding period; and, for each period of the clock signal:

measuring the secondary voltage; and adding the secondary voltage to a volt-second value that represents the estimated magnetic flux.

8. The voltage converter of claim 6, wherein the estimation of the magnetic flux is performed by:

generating or inputting a clock signal having a clock frequency and a corresponding period;

classifying the secondary voltage as being within a first polarity pulse interval, a second polarity pulse interval, or an inactive interval, wherein the first and second polarities are opposite to each other; and for each period of the clock signal:

increasing a flux count by a flux amount responsive to detecting that the secondary voltage is within the first polarity pulse interval, and decreasing the flux count by the flux amount responsive to detecting that the secondary voltage is within the second polarity pulse interval, wherein the flux count represents the estimated magnetic flux.

9. The voltage converter of claim 8, wherein the flux amount is determined by measuring the secondary voltage at a rate that is less than the clock frequency.

10. The voltage converter of claim 1, wherein:

the controller is operable to estimate the magnetic flux based upon the voltage within the conditioning circuit;

the conditioning circuit further includes a rectified voltage node; and the voltage within the conditioning circuit that the magnetic flux estimation is based upon is a rectified voltage at the rectified voltage node.

11. The voltage converter of claim 10, wherein the controller is further operable to estimate the magnetic flux by:

generating or inputting a clock signal having a clock frequency and a corresponding period; and, for each period of the clock signal:

measuring the rectified voltage;

increasing a volt-second value by a measured rectified voltage during intervals when the voltage across the primary winding corresponds to a first polarity, and decreasing the volt-second value by the measured rectified voltage during intervals when the voltage across the primary winding corresponds to a second polarity, wherein the first and second polarities are opposite to each other and the volt-second value represents the estimated magnetic flux.

12. The voltage converter of claim 10, wherein the controller is further operable to estimate the magnetic flux by:

generating or inputting a clock signal having a clock frequency and a corresponding period;

comparing the rectified voltage with a voltage threshold, such that the rectified voltage is classified as being within a rectified voltage pulse interval whenever the rectified voltage exceeds the voltage threshold, and is otherwise classified as being within an inactive interval; and for each period of the clock signal:

increasing a flux count during each rectified voltage pulse interval corresponding to a first polarity of the voltage across the primary winding, and decreasing the count during each rectified voltage pulse interval corresponding to a second polarity of the voltage across the primary winding, wherein the first and second polarities are opposite to each other and wherein the flux count is representative of the estimated magnetic flux.

13. The voltage converter of claim 10, wherein:

the rectified voltage node is coupled to a first terminal of the secondary winding, and the controller is further operable to estimate the magnetic flux based further upon a voltage corresponding to a second voltage node, the second node being coupled to a second terminal of the secondary winding.

14. The voltage converter of claim 1, wherein the flux magnitude limit is based upon a number of turns in the transformer, a cross-sectional area of the transformer, and a flux saturation limit of the transformer.

15. The voltage converter of claim 1, wherein the flux magnitude limit is given by:

$$B_{LIMIT}=N_2A_eB_{sat}-\Delta,$$

wherein $N_2$ is a number of turns of the secondary winding, $A_e$ is a cross-sectional area of the transformer, $B_{sat}$ corresponds to a saturation limit of the transformer in volt-seconds, and $\Delta$ is a non-negative margin.

16. The voltage converter of claim 1, wherein the controller is further operable to balance the magnetic flux within the transformer by:

capturing a positive peak value of the estimated magnetic flux during a cycle of the voltage converter;

capturing a negative peak value of the estimated magnetic flux during the cycle of the voltage converter; and adjusting the series of PWM pulses of the PWM waveforms corresponding to positive and negative half cycles of the voltage across the primary winding in order to balance the magnetic flux induced during the positive and negative half cycles, based upon the positive and the negative peak value, or on an average of the positive and negative peak values.

17. The voltage converter of claim 16, wherein the positive peak value and the negative peak value, or the average of the positive and negative peak values, are low-pass filtered before being used to adjust the series of PWM pulses of the PWM waveforms.

18. The voltage converter of claim 1, wherein the voltage converter is configured in one of a full-bridge topology, an active clamp forward topology, and a push-pull topology.

19. A method within a voltage converter for avoiding magnetic flux saturation within a transformer of the voltage converter, the method comprising:

generating pulse-width modulated (PWM) waveforms for controlling one or more power switches within the voltage converter, wherein each of the PWM waveforms is comprised of a series of PWM pulses;

estimating magnetic flux within the transformer based upon at least one of a voltage across a primary winding of the transformer and a voltage within a conditioning circuit coupled to a secondary winding of the transformer;

detecting an overflux condition in which a magnitude of an estimated magnetic flux has exceeded a flux magnitude limit for the transformer; and responsive to detecting the overflux condition, truncating a pulse within the series of PWM pulses of the PWM waveforms before the PWM waveforms are provided to the one or more power switches.

20. The method of claim 19, wherein estimating the magnetic flux is based upon the voltage across the primary winding.

21. The method of claim 19, wherein estimating the magnetic flux further comprises:

generating or inputting a clock signal having a clock frequency and a corresponding period; and, for each period of the clock signal:

measuring a primary voltage across terminals of the primary winding, wherein the primary voltage is a signed quantity; and adding the primary voltage to a volt-second value that represents the estimated magnetic flux.

22. The method of claim 19, wherein estimating the magnetic flux further comprises:

generating or inputting a clock signal having a clock frequency and a corresponding period;

classifying the voltage across the primary winding as being within a first polarity pulse interval, a second polarity pulse interval, or an inactive interval, wherein the first and second polarities are opposite to each other; and for each period of the clock signal:

increasing a flux count by a flux amount responsive to the voltage across the primary winding being classified within the first polarity pulse interval, and decreasing the flux count by the flux amount responsive to the voltage across the primary winding being classified within the second polarity pulse interval, wherein the flux count represents the estimated magnetic flux.

23. The method of claim 22, wherein the flux amount is determined by measuring the voltage across the primary winding at a rate that is less than that of the clock frequency.

24. The method of claim 19, wherein estimating the magnetic flux is based upon the voltage within the conditioning circuit, the voltage within the conditioning circuit corresponding to a secondary voltage across terminals of the secondary winding.

25. The method of claim 24, wherein the secondary voltage is a signed value and estimating the magnetic flux further comprises:

generating or inputting a clock signal having a clock frequency and a corresponding period; and, for each period of the clock signal:

measuring the secondary voltage; and adding the secondary voltage to a volt-second value that represents the estimated magnetic flux.

26. The method of claim 24, wherein estimating the magnetic flux further comprises:

generating or inputting a clock signal having a clock frequency and a corresponding period;

classifying the secondary voltage as being within a first polarity pulse interval, a second polarity pulse interval, or an inactive interval, wherein the first and second polarities are opposite to each other; and for each period of the clock signal:

increasing a flux count by a flux amount responsive to detecting that the secondary voltage is within the first polarity pulse interval, and decreasing the flux count by the flux amount responsive to detecting that the secondary voltage is within the second polarity pulse interval, wherein the flux count represents the estimated magnetic flux.

27. The method of claim 26, wherein the flux amount is determined by measuring the secondary voltage at a rate that is less than the clock frequency.

28. The method of claim 19, wherein:

estimating the magnetic flux is based upon the voltage within the conditioning circuit; and the voltage within the conditioning circuit that the magnetic flux estimation is based upon is a rectified voltage.

29. The method of claim 28, wherein estimating the magnetic flux further comprises:

generating or inputting a clock signal having a clock frequency and a corresponding period; and, for each period of the clock signal:

measuring the rectified voltage;

increasing a volt-second value by a measured rectified voltage during intervals when the voltage across the primary winding corresponds to a first polarity, and decreasing the volt-second value by the measured rectified voltage during intervals when the voltage across the primary winding corresponds to a second polarity, wherein the first and second polarities are opposite to each other and the volt-second value represents the estimated magnetic flux.

30. The method of claim 28, wherein estimating the magnetic flux further comprises:

generating or inputting a clock signal having a clock frequency and a corresponding period;

comparing the rectified voltage with a voltage threshold, such that the rectified voltage is classified as being within a rectified voltage pulse interval whenever the rectified voltage exceeds the voltage threshold, and is otherwise classified as being within an inactive interval; and for each period of the clock signal:

increasing a flux count during each rectified voltage pulse interval corresponding to a first polarity of the voltage across the primary winding, and decreasing the count during each rectified voltage pulse interval corresponding to a second polarity of the voltage across the primary winding, wherein the first and second polarities are opposite to each other and wherein the flux count is representative of the estimated magnetic flux.

31. The method of claim 19, wherein the flux magnitude limit is based upon a number of turns in the transformer, a cross-sectional area of the transformer, and a flux saturation limit of the transformer.

32. The method of claim 19, wherein the flux magnitude limit is given by:

$$B_{LIMIT}=N_2 A_e B_{sat}-\Delta,$$

wherein $N_2$ is a number of turns of the secondary winding, $A_e$ is a cross-sectional area of the transformer, $B_{sat}$ corresponds to a saturation limit of the transformer in volt-seconds, and $\Delta$ is a non-negative margin.

33. The method claim 19, further comprising balancing the magnetic flux within the transformer by:

capturing a positive peak value of the estimated magnetic flux during a cycle of the voltage converter;

capturing a negative peak value of the estimated magnetic flux during the cycle of the voltage converter; and adjusting the series of PWM pulses of the PWM waveforms corresponding to positive and negative half cycles of the voltage across the primary winding in order to balance the magnetic flux induced during the positive and negative half cycles, based upon the positive and the negative peak value, or on an average of the positive and negative peak values.

34. The method of claim 33, further comprising:

low-pass filtering the positive peak value and the negative peak value, or the average of the positive and negative peak values, and using the filtered values to adjust the series of PWM pulses of the PWM waveforms.

* * * * *